(12) United States Patent
Shimomura

(10) Patent No.: US 7,218,434 B2
(45) Date of Patent: May 15, 2007

(54) OPTICAL SCANNING APPARATUS AND IMAGE FORMING APPARATUS EQUIPPED WITH THE SAME

(75) Inventor: Hidekazu Shimomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 11/136,516

(22) Filed: May 25, 2005

(65) Prior Publication Data

US 2005/0269493 A1    Dec. 8, 2005

(30) Foreign Application Priority Data

Jun. 2, 2004    (JP)    ............... 2004-164644

(51) Int. Cl.
*G02B 26/08* (2006.01)

(52) U.S. Cl. ............ 359/205; 359/212; 359/216; 347/232; 347/259

(58) Field of Classification Search ............... None
See application file for complete search history.

(56) References Cited

U.S. PATENT DOCUMENTS

| 6,683,707 | B2 | 1/2004 | Ishihara et al. | 359/205 |
|---|---|---|---|---|
| 6,760,138 | B2 | 7/2004 | Shimomura | 359/212 |
| 6,774,924 | B2 | 8/2004 | Kato et al. | 347/244 |
| 6,803,942 | B2 | 10/2004 | Sato et al. | 347/259 |
| 6,831,764 | B2 | 12/2004 | Shimomura et al. | 359/207 |
| 6,891,678 | B2 * | 5/2005 | Suhara | 359/654 |
| 6,992,807 | B2 | 1/2006 | Shimomura | 359/307 |
| 7,034,859 | B2 | 4/2006 | Ishihara et al. | 347/244 |
| 7,053,922 | B2 | 5/2006 | Kato et al. | 347/244 |
| 7,068,406 | B2 | 6/2006 | Shimomura | 359/196 |
| 7,075,690 | B2 | 7/2006 | Shimomura | 359/205 |
| 2002/0149668 | A1 * | 10/2002 | Kato | 347/244 |
| 2006/0033799 | A1 | 2/2006 | Ishihara et al. | 347/129 |
| 2006/0072201 | A1 | 4/2006 | Shimomura | 359/566 |
| 2006/0164709 | A1 | 7/2006 | Tomita et al. | 359/205 |

FOREIGN PATENT DOCUMENTS

JP    2003-121773    4/2003

* cited by examiner

*Primary Examiner*—James Phan
(74) *Attorney, Agent, or Firm*—Fitzpatrick, Cella, Harper & Scinto

(57) ABSTRACT

An optical scanning apparatus in which streaks in an image or unevenness in density of an image caused by influences of dusts, scratches and toner etc on the surface of a reflecting member are unlikely to occur and excellent images can be always obtained and an image forming apparatus equipped with such an optical scanning apparatus are to be achieved. The apparatus comprises a first optical system for guiding a light beam emitted from light source unit to deflecting unit, the deflecting unit for reflecting and deflecting the light beam from the first optical system, a second optical system for guiding the light beam reflected and deflected by the deflecting unit onto a surface to be scanned through reflecting unit including n (n is an integer equal to or larger than 1) reflecting members. The apparatus satisfies the following conditions for the F-number $Fno_{main}$ (mm) with respect to a main scanning cross section of an exit side of the second optical system and the smallest beam area Smin (mm$^2$) among beam areas on reflecting surfaces of the n reflecting members on which a light beam is reflected during traveling on the optical axis of the second optical system: $70 < Fno_{main}$, and $(0.004/Smin) \times n < 0.03$.

20 Claims, 15 Drawing Sheets

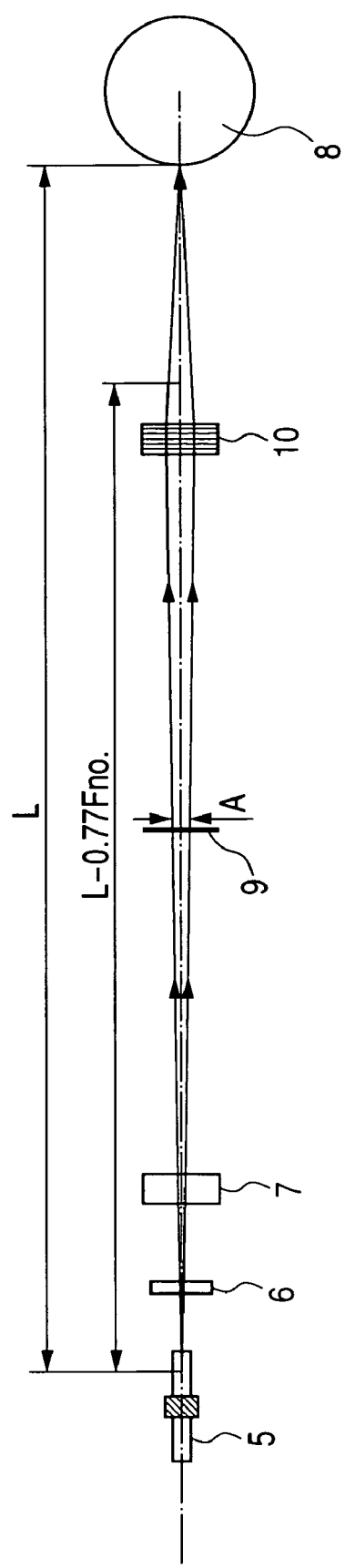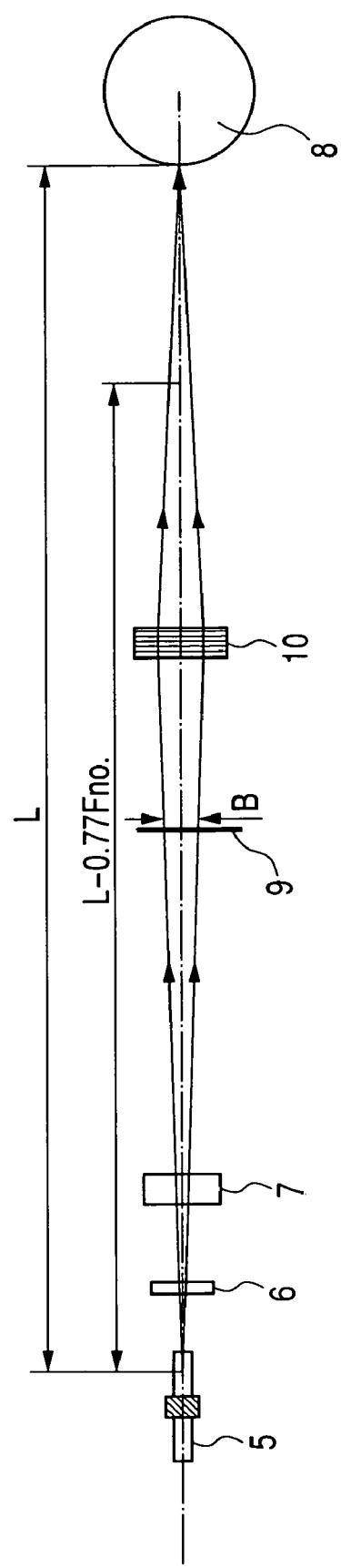

OPTICAL SCANNING APPARATUS AND IMAGE FORMING APPARATUS EQUIPPED WITH THE SAME

BACKGROUND OF THE INVENTION

1. Field of the Invention

The present invention relates to an optical scanning apparatus and an image forming apparatus equipped with the same. More particularly, the present invention is suitably applied to an image forming apparatus, such as a laser beam printer or a digital copying machine using an electrophotography process and a multifunction printer, in which image information is recorded by optically scanning a surface to be scanned by means of a scanning optical system having fθ characteristics with a light beam emitted from a light source and deflected by a polygon mirror serving as a light deflector.

2. Related Background Art

In scanning optical apparatuses such as laser beam printers, a light beam is modulated in accordance with an image signal and emitted from a light source, then is periodically deflected by a light deflector composed of, for example, a rotary polygon mirror (or a polygon mirror), and is converged to form a spot on a surface of a photosensitive recording medium (e.g. a photosensitive drum) by an fθ lens system having fθ characteristics to scan the surface of the recording medium, thereby image recording is conventionally performed (see Japanese Patent Application Laid-Open No. 2003-121773).

FIG. 10 is a cross sectional view schematically showing the principal portion of a conventional optical scanning apparatus. As shown in FIG. 10, a divergent light beam emitted from a light source means 71 is converted into a substantially parallel light beam or a convergent light beam by a collimator lens 73. Then, the light beam (or the light quantity) is shaped (or adjusted) by an aperture stop 72 and made incident on a cylindrical lens 74 having a refractive power only in the sub-scanning direction. The light beam incident on the cylindrical lens 74 is emitted from it with its state being unchanged with respect to the main scanning cross section but converged with respect to the sub-scanning cross section, and focused as a substantially linear image in the vicinity of a deflecting surface 75a of a light deflector 75 composed of a rotary polygon mirror (or a polygon mirror).

The light beam reflected and deflected by the deflecting surface 75a of the light deflector 75 is guided onto the surface of a photosensitive drum serving as a surface to be scanned 78 through an fθ lens system (i.e. a scanning optical system) 76 having fθ characteristics, while the light deflector 75 is rotated in the direction indicated by arrow A to scan the surface of the photosensitive drum 78 in the direction indicated by arrow B (i.e. the main scanning direction) with the light beam.

Optical scanning apparatuses are ordinarily equipped with a turn back mirror(s) for the purpose of size reduction or registrational adjustment etc. FIGS. 11 to 14 are cross sectional views, each showing the principal portion of an image forming apparatus. FIG. 11 shows an arrangement in which the optical scanning apparatus 200 is not equipped with a turn back mirror. FIGS. 12 to 14 show arrangements in which at least one turn back mirror is provided in the optical scanning apparatus 200 to fold an optical path.

The image forming apparatus shown in FIG. 11 is disadvantageous in terms of size reduction and cost saving, since there are many useless spaces (the hatched portions) in the apparatus and many scanning lenses are required to shorten the optical path length. Generally speaking, as the number of the turn back mirrors increases, the freedom of arrangement of the optical path increases and the apparatus as a whole can be made more compact, though this is not always the case and the situation may change depending on the configuration of the parts in the optical scanning apparatus.

Conventionally, infrared lasers (with an oscillation wavelength of 780 nm) or infrared lasers (with an oscillation wavelength of 675 nm) have been used as semiconductor lasers serving as the light source means. However, optical apparatuses that can provide a small spot by means of a short-wavelength laser with an oscillation wavelength of shorter than or equal to 500 nm are under development to meet demands for higher resolutions. An advantage of the use of the short-wavelength laser is that it is possible to realize a spot diameter as small as approximately half the spot diameter attained in conventional apparatuses, while maintaining the F-number of the exit side of the scanning optical system as large as that in conventional apparatuses.

In addition, if the spot diameter is equal to that in conventional apparatuses, the F-number of the exit side of the scanning optical system can be made approximately twice as large as that in conventional apparatuses. Thus, the depth of focus at the surface of the photosensitive drum is greatly increased. (Note that the depth of focus is proportional to the wavelength of the light emitted from the light source and to the square of the F-number of the exit side of the scanning optical system). Accordingly, the cost can be reduced by allowing a decrease in the degree of accuracy of various parts or by eliminating an adjustment mechanism that is necessary in conventional apparatuses.

FIGS. 15 and 16 are cross sectional views in the main scanning direction (or main scanning cross sectional views) showing the principal part of optical scanning apparatuses in which a spot having a diameter of 60 μm with respect to the main scanning direction is formed using an infrared laser 81 with an oscillation wavelength λ of 780 nm and a blue-violet laser 1 with an oscillation wavelength λ of 405 nm respectively.

FIGS. 17 and 18 are graphs representing the depth of focus in the arrangements shown in FIGS. 15 and 16 respectively. In each graph, depth curves for a slice level of 75 μm are drawn with the horizontal axis representing the image height and the vertical axis representing the optical axis direction (defocus direction) of the scanning optical system. As will be seen from the depth curves, the depth of focus can be greatly increased with the spot diameter unchanged, as the oscillation wavelength of the light source is made shorter.

If recording of image information is to be performed at a high degree of accuracy with the above-described optical scanning apparatus, it is necessary that the curvature of field be excellently corrected all over the surface to be scanned, distortion characteristics with constant velocity characteristic (fθ characteristics) be established between the image angle θ and the image height, and the spot diameter on the image surface be constant at different image heights. As mentioned above, FIGS. 15 and 16 are main scanning cross sectional views of the optical scanning apparatuses in which the spot size is set to 60 μm with an infrared laser and a blue-violet laser respectively, and it will be seen that the beam width is smaller in the optical scanning apparatus shown in FIG. 16 in which the blue-violet laser with the smaller wavelength is used.

In the optical scanning apparatus using the blue-violet laser, it is possible to increase the depth of focus as compared to the apparatus using the infrared laser and cost reduction can be achieved by decreasing the degree of accuracy etc., but such an apparatus is sensitive to influences of scratches, dusts or scattered toner present on the surface of optical components since the width of the light beam is narrow.

FIG. 19 illustrates a scratch, dust and toner present on the surface of a turn back mirror. FIG. 20 shows a printed image that has been formed using such a turn back mirror. Since the laser (or the light source) is normally operated while image writing is performed, if the light beam is partially blocked by dust etc., the image density will become low at the corresponding position, and a white streak can be produced in the worst case.

As is well known, the shorter the wavelength of a light beam is, the more strongly the beam is affected by dispersion. When particles of several microns such as toner particles are adhering on the surface of the mirror, the phenomenon that a portion of the scanning light is prevented from reaching the surface of the photosensitive drum by dispersion may occur.

Therefore, employment of the blue-violet laser directly leads to the problem of unevenness in density of an image caused by small particles such as toner particles adhering on the mirror. In the case of a color image forming apparatus utilizing such an optical scanning apparatus, the problem appears as unevenness in color in an image. Therefore, in the optical scanning apparatus using a blue-violet laser, it has been necessary to take care of scratches, dust and the like more closely than usual, which leads to an increase in the production cost.

SUMMARY OF THE INVENTION

According to one aspect of the present invention, an optical scanning apparatus comprises light source means, deflecting means, a first optical system for guiding a light beam emitted from the light source means to the deflecting means, and a second optical system for guiding the light beam reflected and deflected by the deflecting means to a surface to be scanned via reflecting means including n (n is an integer equal to or larger than 1) reflecting members, wherein the following conditions are satisfied:

$$70 < Fno_{main}, \text{ and}$$

$$(0.004/Smin) \times n < 0.03$$

where $Fno_{main}$ (mm) is the F-number with respect to a main scanning cross section of an exit side of the second optical system, and Smin (mm$^2$) is the smallest beam area among beam areas on reflecting surfaces of the n reflecting members on which the light beam is reflected during traveling on the optical axis of the second optical system.

According to a further aspect of the present invention, in the optical scanning apparatus, the n reflecting members are provided at positions so as to satisfy the following condition:

$$Xi < L - 0.77 \times Fno_{main}$$

where L (mm) is the distance from a deflection point of the light beam reflected by the deflecting means to the surface to be scanned, and Xi (i=1, 2, . . . , n) (mm) is the distance from the deflection point to the i-th reflecting member of the n reflecting members.

According to a further aspect of the present invention, in the optical scanning apparatus, the following condition is satisfied:

$$0.5 < |\beta|$$

where $\beta$ is the imaging magnification in a sub-scanning direction of the second optical system.

According to a further aspect of the present invention, in the optical scanning apparatus, at least one reflecting member among the n reflecting members is disposed on the deflecting means side of an imaging optical element that has the strongest optical power in the sub-scanning direction in the second optical system.

According to a further aspect of the present invention, in the optical scanning apparatus, the wavelength of the light beam emitted from the light source means is equal to or smaller than 500 nm.

According to another aspect of the present invention, an optical scanning apparatus comprises light source means, deflecting means, a first optical system for guiding a light beam emitted from the light source means to the deflecting means, and a second optical system for guiding the light beam reflected by the deflecting means to a surface to be scanned via reflecting means including n (n is an integer equal to or larger than 1) reflecting members, wherein the wavelength of the light beam emitted from the light source means is equal to or smaller than 500 nm, and the following condition is satisfied:

$$(0.004/Smin) \times n < 0.03$$

where Smin (m$^2$) is the smallest beam area among beam areas on reflecting surfaces of the n reflecting members on which the light beam is reflected during traveling on the optical axis of the second optical system.

According to a further aspect of the present invention, in the optical scanning apparatus, the n reflecting members are provided at positions so as to satisfy the following condition:

$$Xi < L - 0.77 \times Fno_{main}$$

where $Fno_{main}$ (mm) is the F-number of an exit side of the second optical system in a main scanning cross section, L (mm) is the distance from a deflection point of the light beam reflected by the deflecting means to the surface to be scanned, and Xi (i=1, 2, . . . , n) (mm) is the distance from the deflection point to the i-th reflecting member of the n reflecting members.

According to a further aspect of the present invention, in the optical scanning apparatus, the following condition is satisfied:

$$0.5 < |\beta|$$

where $\beta$ is the imaging magnification in a sub-scanning direction of the second optical system.

According to a further aspect of the present invention, in the optical scanning apparatus, at least one reflecting member among the n reflecting members is disposed on the deflecting means side of an imaging optical element that has the strongest optical power in the sub-scanning direction in the second optical system.

According to a further aspect of the present invention, in the optical scanning apparatus, the reflecting member is a turn back mirror.

According to a further aspect of the present invention, in the optical scanning apparatus, the light beam emitted from the light source means is incident on a deflecting surface of the deflecting means with a beam width wider than the width of the deflecting means in a main scanning direction.

According to another aspect of the present invention, an image forming apparatus comprises an optical scanning apparatus set out in the foregoing, a photosensitive member disposed on the surface to be scanned, a developing device for developing an electrostatic latent image formed on the photosensitive member by a light beam scanned by the optical scanning apparatus as a toner image, a transferring device for transferring a developed toner image onto a material to be transferred, and a fixing device for fixing a transferred toner image on the material to be transferred.

According to another aspect of the present invention, an image forming apparatus comprises an optical scanning apparatus set out in the foregoing and a printer controller that converts code data input from an external device into an image signal and inputs the image signal to the optical scanning apparatus.

According to another aspect of the present invention, a color image forming apparatus comprises a plurality of image bearing members on which images of different colors are respectively formed, the image bearing members being disposed on the surfaces to be scanned of optical scanning apparatuses set out in the foregoing.

According to a further aspect of the present invention, in the color image forming apparatus, the apparatus has a printer controller that converts color signals inputted from an external device into image data of different colors and input the image data of different colors to the respective optical scanning apparatuses.

According to the present invention, in an optical scanning apparatus using a short-wavelength light source, it is possible to reduce streaks in an image or unevenness in density of an image caused by influences of dusts, scratches and toner etc. on the surface of reflecting members by appropriately arranging the number and positions of the reflecting members such as turn back mirrors to realize an optical scanning apparatus with which excellent images are always obtained and an image forming apparatus equipped with such an optical scanning apparatus.

Furthermore, with a color image forming apparatus equipped with such an optical scanning apparatus, excellent images free from streaks, unevenness in density and unevenness in color can be obtained.

BRIEF DESCRIPTION OF THE DRAWINGS

FIG. 5A is a diagram for illustrating relationship between the imaging magnification with respect to the sub-scanning direction and the light beam width in the second embodiment (in the case in which the imaging magnification β satisfies |β|<0.5).

FIG. 5B is a diagram for illustrating relationship between the imaging magnification with respect to the sub-scanning direction and the light beam width in the second embodiment (in the case in which the imaging magnification β satisfies |β|>0.5).

DESCRIPTION OF THE PREFERRED EMBODIMENTS

In the following, embodiments of the present invention will be described with reference to drawings.

(First Embodiment)

Figure 1:
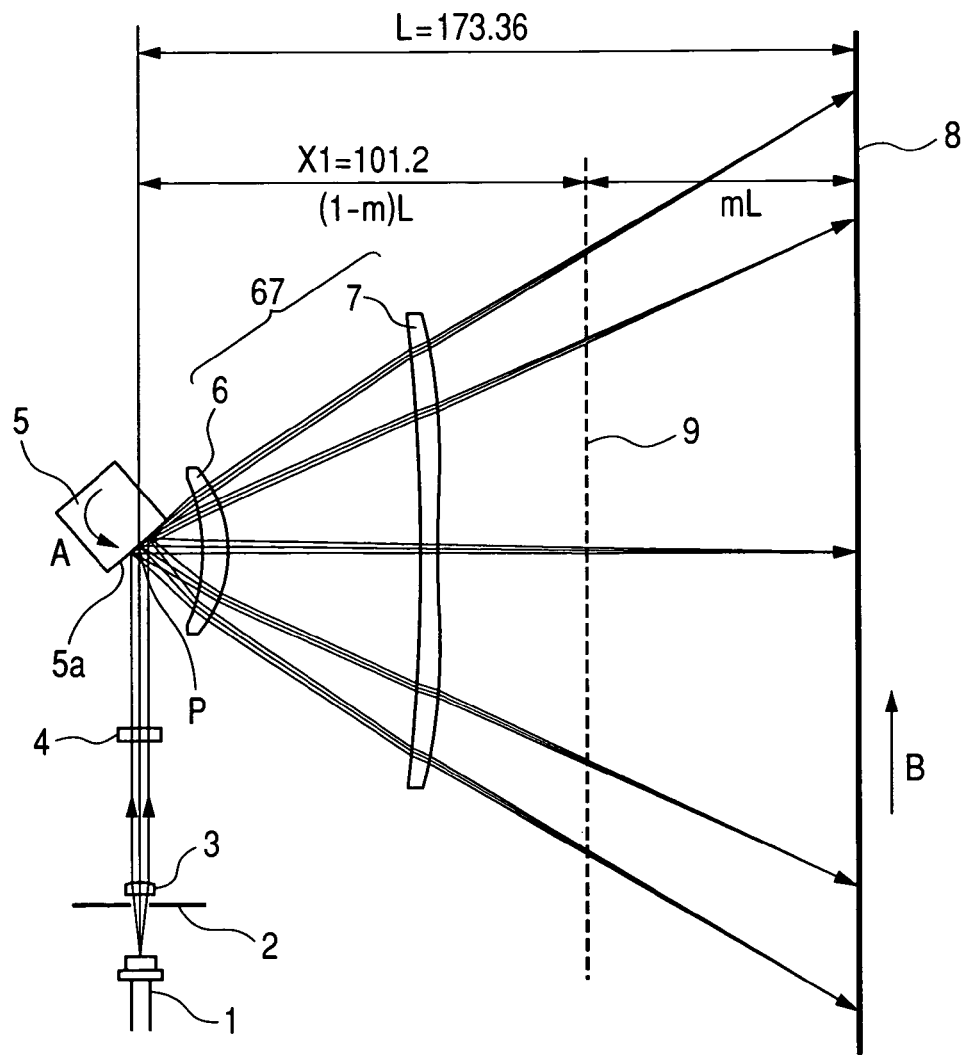
FIG. 1 is a main scanning cross sectional view of a first embodiment of the present invention.
Figure 2:
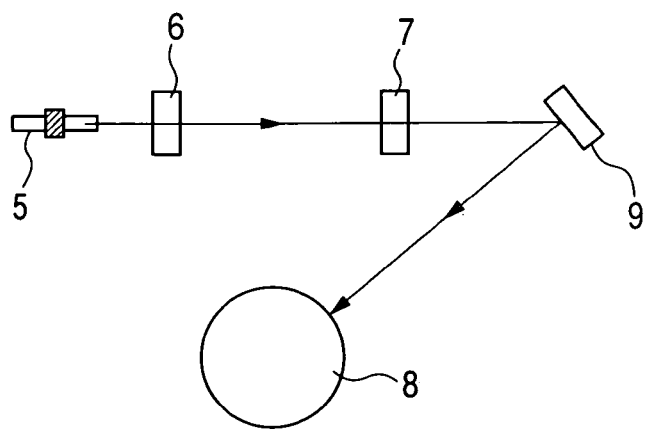
FIG. 2 is a sub-scanning cross sectional view of the first embodiment of the present invention.

FIG. 1 is a cross sectional view taken on a main scanning cross section (in the main scanning direction) (or a main scanning cross sectional view) showing the principal portion of an optical scanning apparatus according to the first embodiment of the present invention. FIG. 2 is a cross sectional view taken on a sub-scanning cross section (in the sub-scanning direction) (or a sub-scanning cross sectional view) showing the principal portion of the optical scanning apparatus according to the first embodiment of the present invention.

Here, the main scanning direction refers to the direction orthogonal to the rotation axis of deflecting means and to the optical axis of a scanning optical element (that is, the direction in which the light beam is reflected and deflected (or deflected and scanned)), and the sub-scanning direction refers to the direction parallel to the rotation axis of the deflecting means. The main scanning cross section refers to the plane that is parallel to the main scanning direction and includes the optical axis of the scanning optical system. The sub-scanning cross section refers to the cross section orthogonal to the main scanning cross section.

In FIG. 1, reference numeral 1 designates light source means, which is composed, for example, of a blue-violet laser serving as a short-wavelength light source with an oscillation wavelength (dominant wavelength: central wave length of light beam) λ of 405 nm (which is smaller than 500 nm). Reference numeral 2 designates an aperture stop, which regulates the beam passing therethrough to shape it. Reference numeral 3 designates a light beam conversion element (or a collimator lens), which converts the light beam that has been shaped by the aperture stop 3 into a substantially parallel light beam (or a slightly divergent beam or a slightly convergent beam, alternatively). Reference numeral 4 designates an optical system (a cylindrical lens) that has a predetermined optical power only in the sub-scanning direction to focus the light beam having passed through the collimator lens 3 on a deflecting surface (or a reflecting surface) 5a of a light deflector 5, which will be described later, as a substantially linear image in the sub-scanning cross section. The elements such as the aperture stop 2, the collimator lens 3, and the cylindrical lens 4 are components of the first optical system (or the incidence optical system).

Reference numeral 5 designates a light deflector serving as the deflecting means. The light deflector 5 is composed, for example, of a polygon mirror (i.e. a rotary polygon mirror) having four surfaces, which is rotated in the direction indicated by arrow A in FIG. 1 at a constant speed by driving means (not shown) such as a motor.

Reference numeral 67 designates a scanning optical system (an fθ lens system) serving as the second optical system having fθ characteristics. The scanning optical system 67 is composed of two fθ lenses 6 and 7 and focuses the light beam corresponding to image information that has been reflected and deflected by the light deflector 5 onto a surface to be scanned or the surface of a photosensitive drum 8 via a turn back mirror 9 (which will be described later). The deflecting surface 5a of the light deflector 5 and the photosensitive drum surface 8 are configured to be conjugate to each other in the sub-scanning cross section to achieve an optical face tangle error correction function. In this embodiment, the F-number with respect to the main scanning cross section of the exit side of the scanning optical system 67 is 87.2 ($Fno_{main}$=87.2), which is larger than 70.

Reference numeral 8 designates the surface of the photosensitive drum serving as the surface to be scanned, and reference numeral 9 designates a reflecting member serving as reflecting means, composed of a turn back mirror.

In this embodiment, a light beam emitted from the semiconductor laser 1 is regulated in terms of its beam width by the aperture stop 2 so as to obtain a desired spot diameter, then converted into a substantially parallel light beam by the collimator lens 3 and made to enter the cylindrical lens 4. The substantially parallel light beam incident on the cylindrical lens 4 is emitted without any change within the main scanning section. On the other hand, within the sub-scanning section, the light beam is converged and focused onto a deflecting surface 5a of the light deflector 5 as a linear image (i.e. a linear image extending along the main scanning direction). The light beam having reflected and deflected by the deflecting surface 5a of the light deflector 5 is focused on the photosensitive drum surface 8 as a spot by the first and second fθ lenses 6 and 7 via the turn back mirror 9 to scan the photosensitive drum surface 8 with light at a constant speed in the direction indicated by arrow B (i.e. in the main scanning direction) as the light deflector 5 is rotated in the direction indicated by arrow A. With this process, an image is recorded on the surface of the photosensitive drum 8 serving as a recording medium.

Here, the optical configuration and the surface shapes in this embodiment are presented in Table 1 below.

TABLE 1

| wavelength, refractive index | | | toric lens 1 surface shape | | | toric lens 2 surface shape | |
|---|---|---|---|---|---|---|---|
| wavelength used | λ (nm) | 405 | | First surface | Second surface | | First surface | Second surface |
| refractive index of toric lens 1 | n | 1.54662 | R | −3.31999E+01 | −2.36711E+01 | R | −4.77809E+02 | 5.88860E+02 |
| | | | K | −1.85523E+00 | −1.18803E+00 | K | | 2.10024E+01 |
| refractive index of toric lens 2 | n | 1.54662 | B4 | 3.79682E−06 | −1.95390E−06 | B4 | | −1.32791E−06 |
| | | | B6 | 1.79966E−08 | 1.65151E−08 | B6 | | 3.56580E−10 |
| | | | B8 | −1.22416E−10 | −4.80429E−11 | B8 | | −6.98413E−14 |
| beam angle | | | B10 | 1.75955E−13 | 2.67537E−14 | B10 | | 5.96617E−18 |
| polygon incidence angle | θp | −90 | r0 | 1.25060E+02 | −4.27542E+01 | r0 | −8.41399E+01 | −1.91228E+01 |
| polygon largest exit angle | θe | 40.87 | D2s | −7.88981E−03 | 4.38712E−04 | D2s | −1.05276E−04 | 1.53559E−04 |
| position | | | D4s | 3.40696E−05 | 1.07346E−05 | D4s | 1.70063E−08 | −9.52162E−08 |
| | | | D6s | −5.93736E−08 | −2.21146E−08 | D6s | | 2.83128E−11 |
| deflection point - toric lens 1 | e0 | 16.5 | D8s | | 5.47874E−10 | D8s | | −3.27869E−15 |
| center thickness Of toric lens 1 | d1 | 6 | D10s | | | D10s | | |
| Toric lens 1 - toric lens 2 | e1 | 44.7 | D2e | −7.88981E−03 | 2.21997E−03 | D2e | −8.70975E−05 | 1.53559E−04 |
| center thickness Of toric lens 2 | d2 | 4 | D4e | 3.40696E−05 | −2.13404E−05 | D4e | 1.07989E−08 | −9.52162E−08 |
| Toric lens 2 - turn back mirror | e2 | 30 | D6e | −5.93736E−08 | 2.38431E−07 | D6e | | 2.83128E−11 |
| turn back mirror - surface to be scanned | e3 | 72.16 | D8e | | −2.29192E−10 | D8e | | −3.27869E−15 |
| deflection point - surface to be scanned | L | 173.36 | D10e | | | D10e | | |
| effective scanning width | W | 214 | | | | | | | suffix s represents opposite side to laser
suffix e represents laser side

The meridional line of each of the incidence surface and exit surface of the first and second fθ lenses 6 and 7 is designed to have an aspherical shape that can be represented by function up to the tenth order. The meridional direction corresponding to the main scanning direction is expressed by the following formula, where the origin is set at the point of intersection of the surface of the fθ lens and the optical axis, the X axis is set along the optical axis, and the Y axis is set as the axis orthogonal to the optical axis in the main scanning cross section:

$$X = \frac{Y^2/R}{1+\sqrt{1-(1+k)(Y/R)^2}} + B4 \times Y^4 + B6 \times Y^6 + B8 \times Y^8 + B10 \times Y^{10}$$

where R is the radius of curvature of the meridional line, and K, B4, B6, B8 and B10 are aspherical coefficients.

The sagittal direction corresponding to the sub-scanning direction is expressed by the following formula, $$S = \frac{Z^2/Rs^*}{1+\sqrt{1-(Z/Rs^*)^2}}$$

Where S is the sagittal shape defined in the plane including the normal line of the meridional line in the respective position in the meridional direction and orthogonal to the main scanning plane.

Here, the radius of curvature (the sagittal radius of curvature) Rs* with respect to the sub-scanning direction at the position away from the optical axis by distance Y in the main scanning direction is represented by the following formula:

$$Rs^* = Rs \times (1 + D2 \times Y^2 + D4 \times Y^4 + D6 \times Y^6 + D8 \times Y^8 + D10 \times Y^{10})$$

where Rs is the sagittal radius of curvature on the optical axis, and D2, D4, D6, D8 and D10 are sagittal variation coefficients.

Although the surface shape in this embodiment is defined by the above formulas, the scope of the present invention is not limited by them.

In this embodiment, a short-wavelength light source with an oscillation wavelength λ of 405 nm is used as mentioned before, the spot diameter in the main scanning cross section is set to 60 μm, and the spot diameter in the sub-scanning cross section is set to 70 μm, in the whole effective scanning area.

Here, the spot diameter refers to the diameter of a cross section obtained by slicing a light intensity distribution at $1/e^2$ of the peak light intensity.

Figure 15:
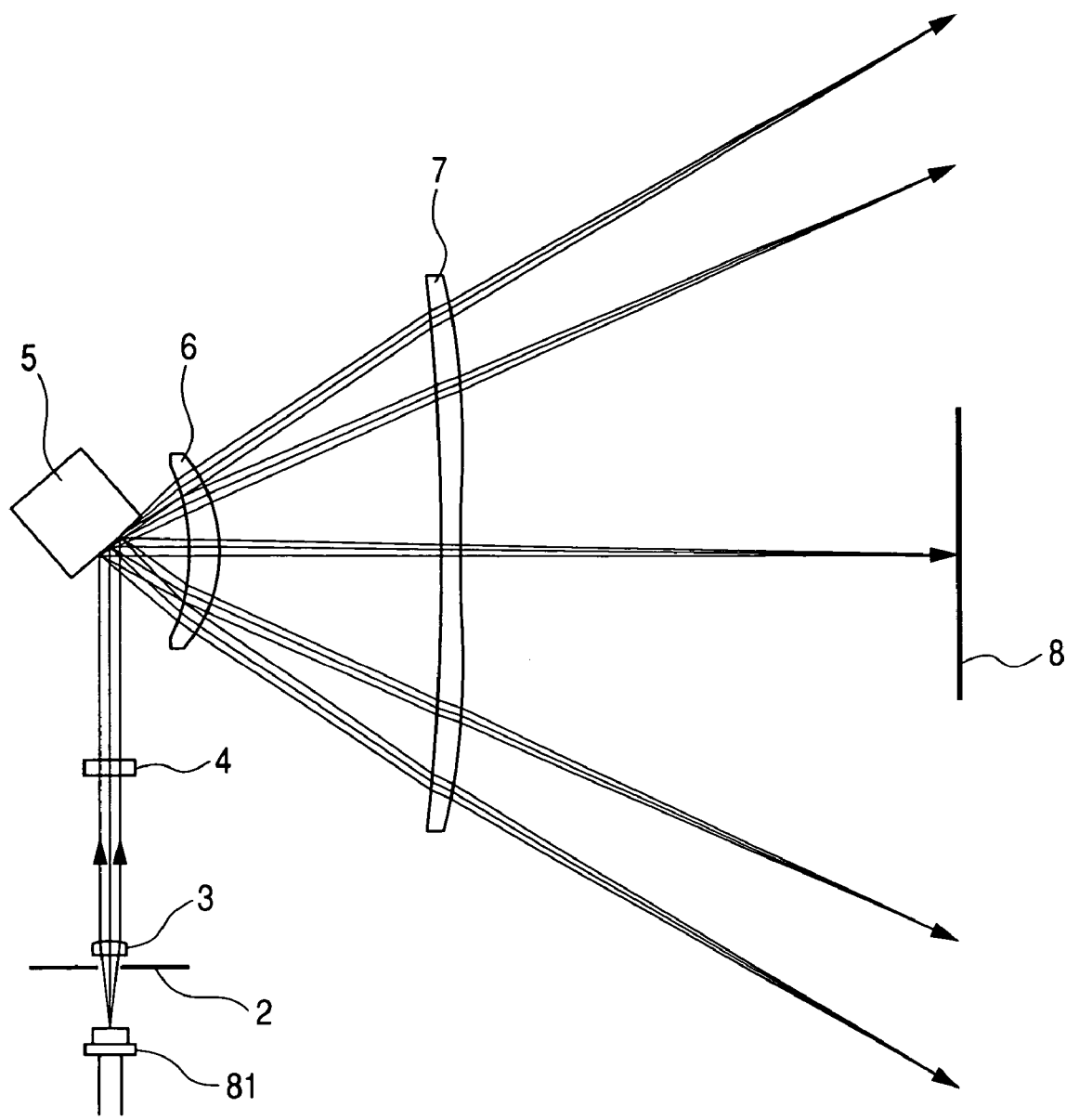
FIG. 15 is a main scanning cross sectional view of an optical scanning apparatus in which an infrared laser is used.
Figure 16:
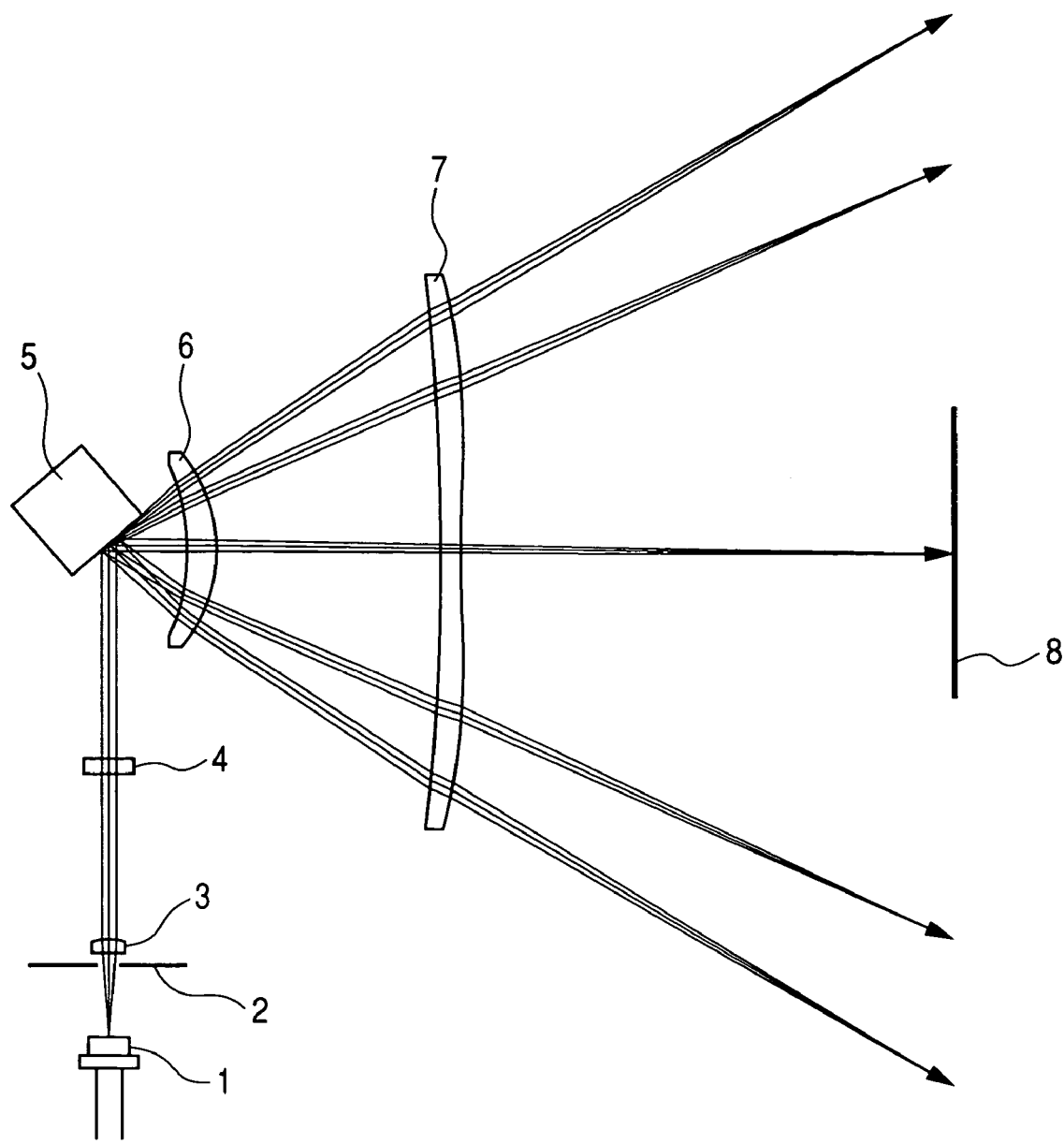
FIG. 16 is a main scanning cross sectional view of an optical scanning apparatus in which a blue-violet laser is used.
Figure 17:
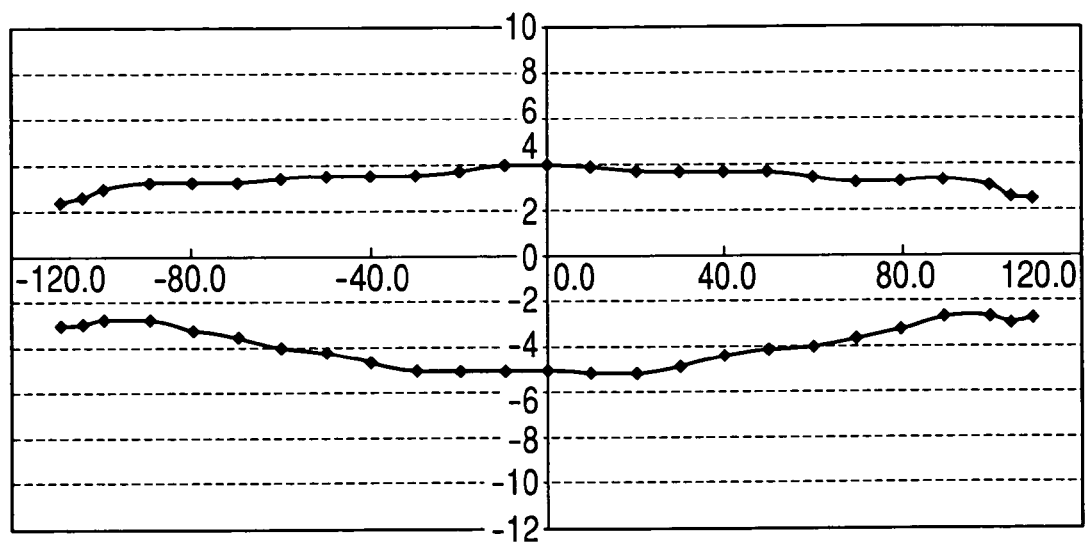
FIG. 17 is a graph showing depth of focus curves for an optical scanning apparatus in which an infrared laser is used.
Figure 18:
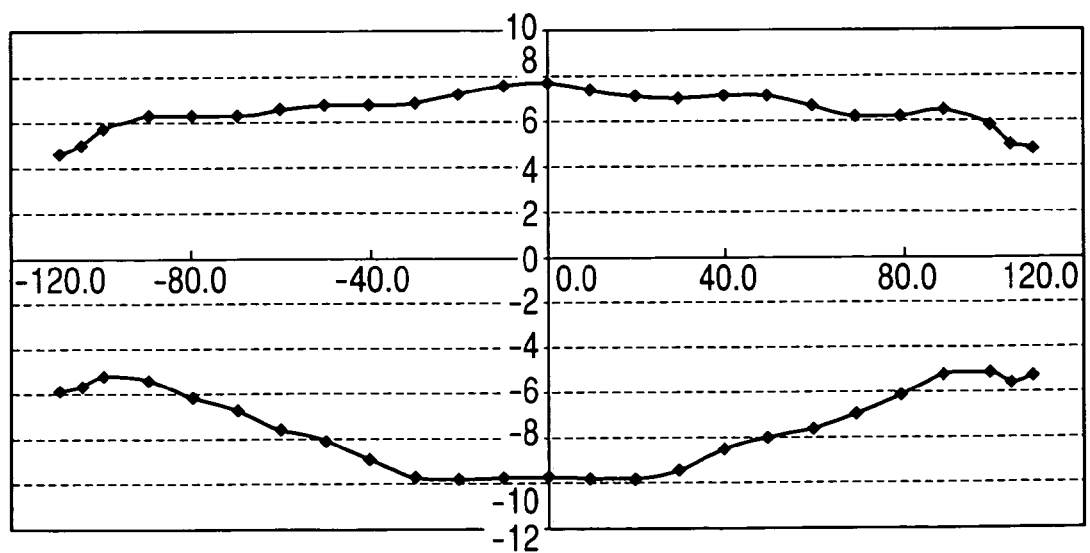
FIG. 18 is a graph showing depth of focus curves for an optical scanning apparatus in which a blue-violet laser is used.
Figure 19:
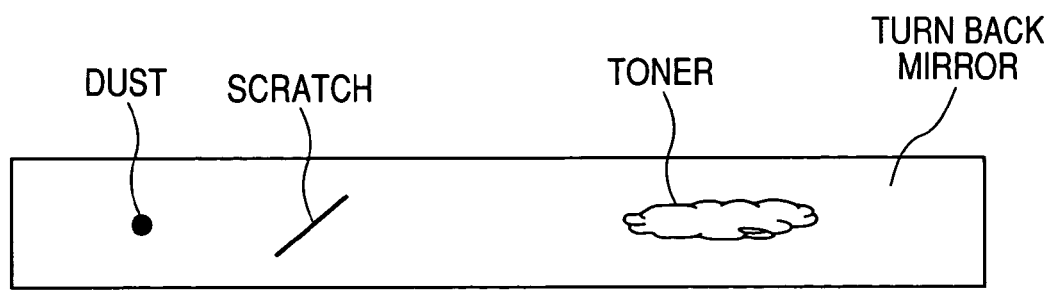
FIG. 19 illustrates a dust, scratch and toner present on a mirror.
Figure 20:
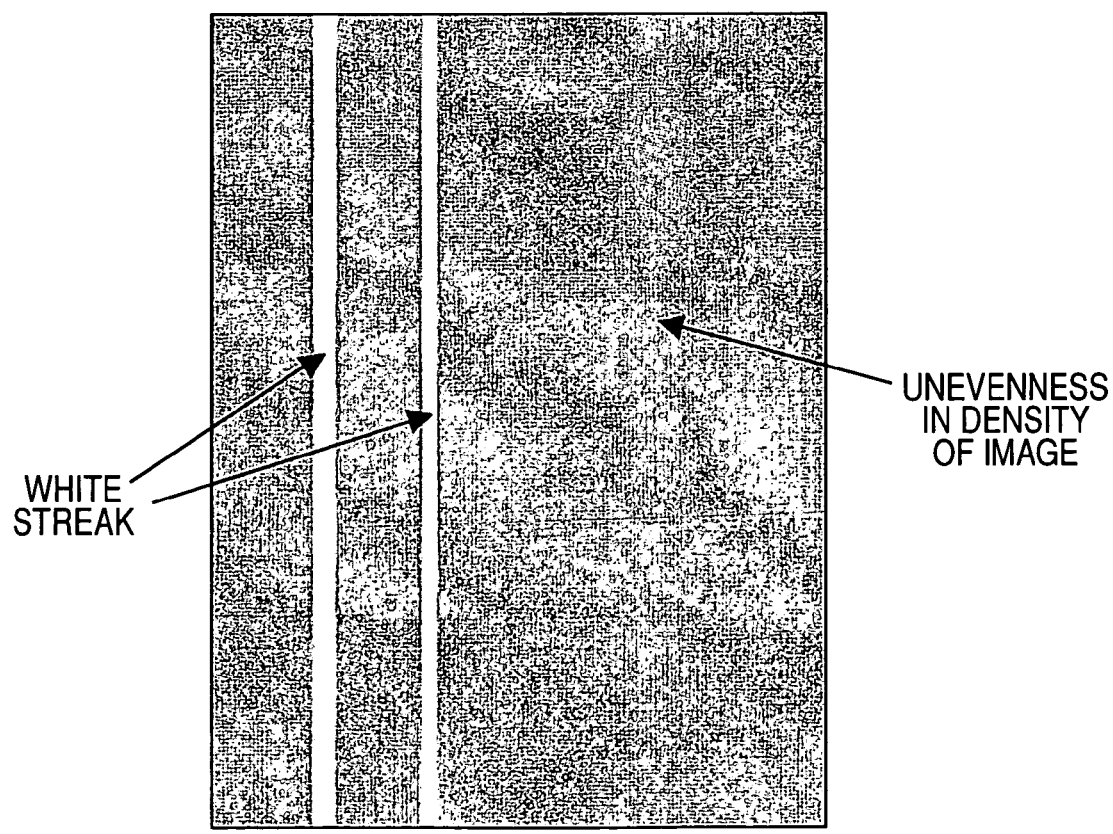
FIG. 20 shows examples of streaks and unevenness in density of an image.

From comparison of the embodiment of the present invention shown in FIG. 1 and the conventional arrangement shown in FIG. 15, it will be seen that the beam width in this embodiment is approximately half that of the conventional arrangement.

In this embodiment, the optical path is bent once in the sub-scanning direction by the turn back mirror 9 to make the apparatus compact as a whole, as shown in FIG. 2. An increase in the number of times of the bending will lead to an increased freedom of arrangement, but it will invite an increase in advertent influences of dusts, scratches and toner present on the reflection surfaces.

In view of this, this embodiment is so arranged that the number n (n is an integer equal to or more than 1) of turn back mirrors and the smallest value Smin (mm²) among the beam areas on the respective reflection surfaces (positions) of the turn back mirrors, of the light beam traveling on the optical axis of the scanning optical system 67 satisfy the following condition.

$$(0.004(\text{mm}^2)/S\text{min}) \times n < 0.03 \quad (1)$$

In this embodiment, n=1.

The turn back mirror 9 in this embodiment is disposed at a distance 101.2 mm from the deflection point P so as to satisfy condition (2) described later. The beam area of the light beam traveling on the optical axis of the scanning optical system 67 at that position (i.e. on the reflection surface) is:

$$S = 0.4139 \times 0.3539 \times \pi = 0.46 \ (\text{mm}^2).$$

Thus, substituting S=0.46 and n=1 into condition (1) shows as follows, which satisfies the condition (1).

$$(0.004/0.46) \times 1 = 0.0087 < 0.03$$

Here, the values 0.4139 and 0.3539 were obtained by calculation using an optical CAD based on the lens data presented in Table 1 as beam widths with which the spot diameter on the surface to be scanned becomes 60 μm in the main scanning direction and 70 μm in the sub-scanning direction. The values 0.4268 and 0.3214 in the second embodiment and the values 0.4900 and 0.04231 in the third embodiment, which will be described later, were obtained in the same manner.

Here, we describe how condition (1) presented above is derived.

It is very difficult to visually recognize a dust or a scratch with a diameter smaller than 0.07 mm present on an optical part such as a turn back mirror, therefore 0.004 mm² is the limit value of the area of a dust or scratch that can be normally controlled. In addition, an abrupt change in the light quantity at a ratio more than 3% will appear as a streak in the image, which depends on factors in the electrophotography process such as development and fixing. In view of the above, it is important to control the ratio of a decrease in the light quantity (i.e. the left side of condition (1)) caused by a dust or a scratch adhering on the turn back mirror to a ratio of 3% or less.

Arrangements outside the numerical range of the above condition (1) are undesirable, since a streak or unevenness in the density of an image due to an influence of a dust, scratch and toner on the surface of the turn back mirror will appear.

Furthermore, to reduce the appearance of a streak and unevenness in the density of an image caused by a dust, scratch or toner, it is preferred that the mirror 9 be disposed in the range that satisfies the following condition:

$$Xi < L - 0.77 \cdot Fno_{main} \ (\text{mm}) \quad (2)$$

where $Fno_{main}$ is the F-number with respect to the main scanning direction of the exit side of the scanning optical system, L (mm) is the distance from the deflection point P of the light beam deflected by the light deflector 5 to the surface to be scanned 8, and Xi (i=1, 2, . . . , n) is the distance from the deflection point P to the turn back mirror 9.

The F-number $Fno_{main}$ with respect to the main scanning direction of the exit side of the scanning optical system 67 in this embodiment is 87.2 ($Fno_{main}$=87.2), and the distance L from the deflection point P to the surface to be scanned 8 is 173.36 (L=173.36).

Thus, in this embodiment, the turn back mirror 9 is disposed at distance Xi from the deflection point P so as to satisfy the following condition (2), $$Xi < L - 0.77 \cdot Fno_{main}, \quad (2)$$

by substituting $L - 0.77 \cdot Fno_{main} = 106.02$ (mm), so as to satisfy the following condition, $$Xi < 106.02 \text{ (mm)}.$$

In this embodiment, X1=101.2, as described above.

The above condition (2) is derived as follows.

In order to make the area on the turn back mirror in which light is blocked by a scratch or dust equal to or less than 1% of the beam area at the position of the turn back mirror, the beam area is equal to or larger than $0.004(\text{mm}^2) \times 100 = 0.4$ $(\text{mm}^2)$.

When the ratio of the distance from the deflection point to the turn back mirror and the distance from the turn back mirror to the surface to be scanned is represented as $(1-m)$:m, the distance between the surface to be scanned and the turn back mirror is mL. The beam area S' at the position of the turn back mirror is represented as follows.

$$S' = (mL/Fno_{main}) \times (mL/FnO_{sub}) \times \pi/4 \quad (A)$$

The spot diameters in the main scanning direction and the sub-scanning direction are usually elliptical with the shorter diameter along the main scanning direction. If it is assumed that the ratio of the diameters is 6:7, the F-number of the exit side in the sub-scanning cross section ($Fno_{sub}$) is expressed as $Fno_{sub} = 1.166 \cdot Fno_{main}$. Substituting S'=0.4 to the equation (A), m can be obtained as follows.

$$m = 0.77 \cdot Fno_{main} \text{ (mm)}/L$$

Therefore, if the turn back mirror is disposed at the distance Xi (i=1, 2, ..., n) (mm) which is distance from the deflection point to the turn back mirror so as to satisfy the following condition, decrease in light quantity caused by a dust or scratch on one turn back mirror can be suppressed to 1% or less, and it is possible to prevent deterioration in the image quality such as a streak in the image, $$Xi < L - mL = L - 0.77 \cdot Fno_{main} \text{ (mm)}.$$

If the turn back mirror is disposed outside the range of the above condition (2), it is necessary to strictly control scratches and dust on the turn back mirror. This is undesirable since this leads to an increase in the cost for example in selecting the turn back mirror. In addition, it is also necessary to provide a countermeasure for preventing flying toner etc. from depositing on the turn back mirror. This also leads to an increase in the cost and is undesirable.

As per the above, according to this embodiment, it is possible to reduce image defects such as a streak in an image or unevenness in density of an image by applying conditions (1) and (2), not disposing turn back mirrors in the space near the photosensitive drum 8 in which the width of the beam is extremely small, and reducing the number of the turn back mirrors disposed between the light deflector and the photosensitive drum 8 as much as possible (preferably, less than four).

(Second Embodiment)

Figure 3:
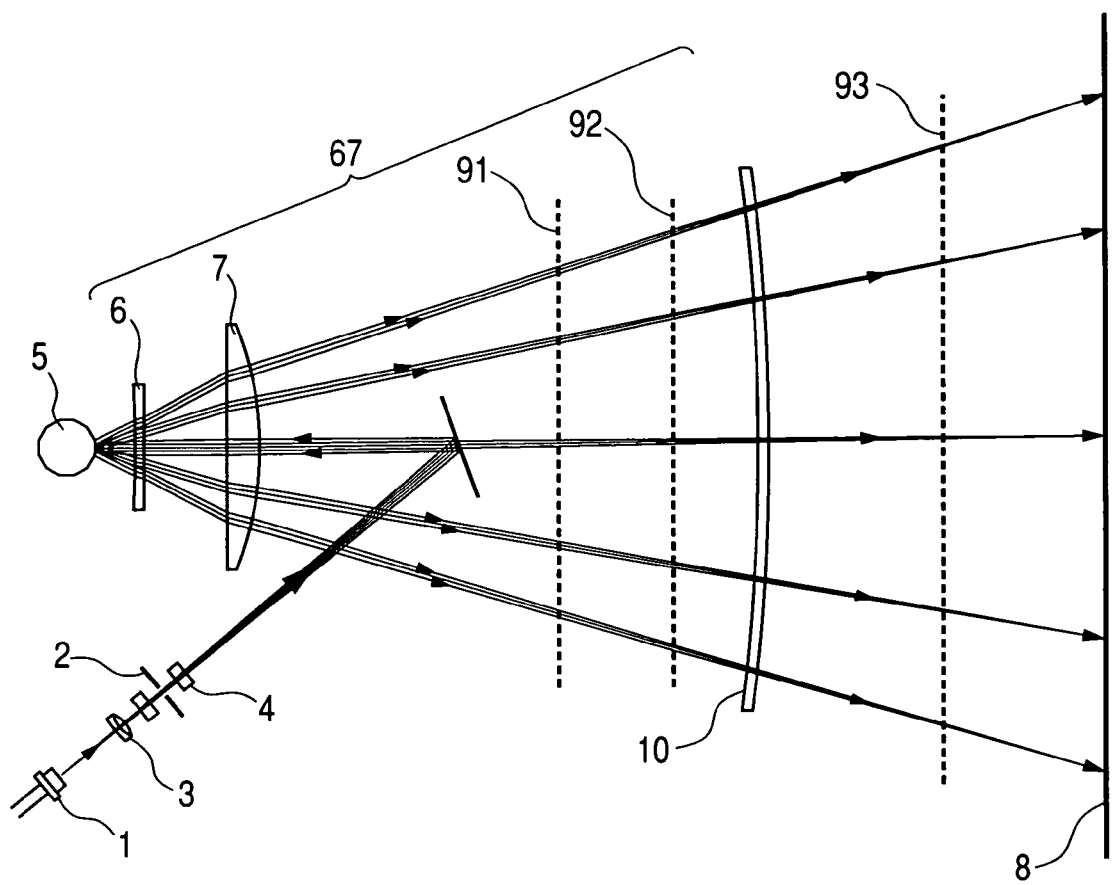
FIG. 3 is a main scanning cross sectional view of a second embodiment of the present invention.
Figure 4:
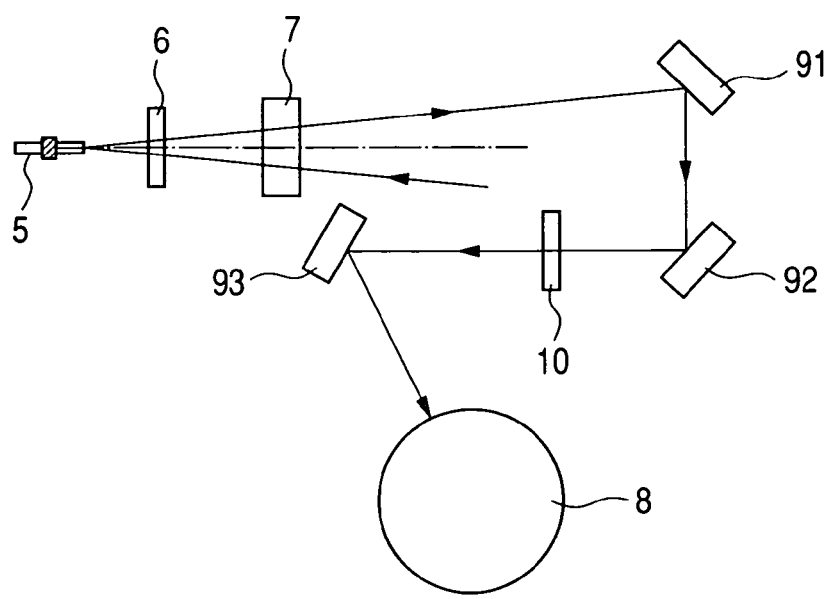
FIG. 4 is a sub-scanning cross sectional view of the second embodiment of the present invention.

FIG. 3 is a cross sectional view in the main scanning direction (or a main scanning cross section) showing the principal portion of the second embodiment of the present invention. FIG. 4 is a cross sectional view in the sub-scanning direction (or a sub-scanning cross section) showing the principal portion of the second embodiment of the present invention. In FIGS. 3 and 4, elements the same as those shown in FIGS. 1 and 2 are designated by the same reference numerals.

What is different in this embodiment from the above-described first embodiment is that the incidence optical system is composed of an overfilled scanning optical system (OFS) and that the reflection means is composed of three turn back mirrors 91, 92 and 93. The other structures and optical functions are substantially the same as those in the first embodiment, and the same advantageous effects are achieved by them.

Specifically, in this embodiment, a light beam emitted from the light source means 1 is made incident on a deflecting surface of the light deflector 5 with a width broader than the width in the main scanning direction of the deflecting surface so that the incident light beam can cover an area larger than the light deflector 5. In addition, in this embodiment, the light beam emitted from the light source means 1 is introduced onto a deflection surface 5a of the light deflector 5 in such a way that the beam is incident from substantially the center of the deflection angle of the light deflector in the main scanning cross section (frontal incidence) and the beam forms a predetermined angle with the plane orthogonal to the axis of rotation of the deflecting device 5 in the sub-scanning cross section (an oblique incidence optical system). The first, second and third turn back mirrors 91, 92 and 93 serve as deflecting means which bends the optical path.

This embodiment is arranged so as to satisfy the following condition for the imaging magnification β with respect to the sub-scanning direction of the scanning optical system 67 is satisfied.

$$0.5 < |\beta| \quad (3)$$

In this embodiment, the imaging magnification β is set to 0.52.

FIGS. 5A and 5B are cross sectional views schematically illustrating relationship between the imaging magnification β with respect to the sub-scanning direction and the width of the beam in the sub-scanning direction. FIG. 5A shows a case in which the condition |β|<0.5 is met, and FIG. 5B shows a case in which the condition |β|>0.5 is met. In FIGS. 5A and 5B, elements the same as those shown in FIG. 3 are designated by the same reference numerals.

It will be seen from FIGS. 5A and 5B that if the turn back mirror 9 is disposed at the same position, the larger imaging magnification with respect to the sub-scanning direction the optical system has, the larger the beam width in the sub-scanning direction is (namely, width A in FIG. 5A is larger than width B in FIG. 5B), and the larger the area in which the beam width is large is.

Furthermore, the distance from the deflection point to the surface to be scanned in the overfilled scanning optical system is larger than that in the underfilled optical system (UFS), and therefore, the optical path is bent multiple times by the turn back mirrors to pack various optical elements in the interior of the image forming apparatus compactly. Therefore, if an overfilled scanning optical system with a significant number of turn back mirrors has a small imaging magnification |β| with respect to the sub-scanning direction in particular, the image is easily affected by dusts, scratches and toner etc. and streaks will appear in the image.

In view of the above, in this embodiment, the imaging magnification |β| with respect to the sub-scanning direction is set within the range of 0.5<|β| to extend the area in which the beam width is large, thereby realizing an optical scanning apparatus in which streaks in the image hardly appear even if it is equipped with a significant number of turn back mirrors.

Here, the optical configuration and the surface shapes in this embodiment are presented in Table 2 below.

TABLE 2

Design data

| wavelength, refractive index wavelength used | λ (nm) | 405 | | first surface | second surface |
|---|---|---|---|---|---|
| | | | | spherical lens surface shape | |
| refractive index of spherical lens | n | 1.84217 | R | −3.38563E+02 | ∞ |
| refractive index of cylindrical lens | n | 1.73170 | | | |
| refractive index of toric lens | n | 1.54662 | | cylindrical lens surface shape | |
| beam angle | | | R | ∞ | −1.52570E+02 |
| polygon incidence angle | θp | 0 | r0 | ∞ | ∞ |
| polygon largest Exit angle position | θe | 26.4 | | toric lens surface shape | |
| deflection points - spherical lens | e0 | 19.87 | R | −1.00000E+03 | −1.00000E+03 |
| center thickness Of spherical lens | d1 | 4 | | | |
| spherical lens - cylindrical lens | e1 | 38.58 | r0 | 1.14115E+02 | −1.08212E+02 |
| center thickness of cylindrical lens | d2 | 15 | D2 | 6.63453E−06 | 8.04607E−06 |
| cylindrical lens - toric lens | e2 | 231.46 | | | |
| center thickness of toric lens | d3 | 4 | | | |
| toric lens - surface to be scanned | e3 | 154.33 | | | |
| deflection point - first mirror | X1 | 204.00 | | | |
| deflection point - second mirror | X2 | 228.8 | | | |
| deflection point - third mirror | X3 | 388.2 | | | |
| deflection point - surface to be scanned | L | 467.24 | | | |
| effective scanning width | W | 159.65 | | | |

In this embodiment, the scanning optical system 67 is composed of three lenses, namely a spherical glass lens 6, a cylindrical glass lens 7 and a toric plastic lens 10. The scanning optical system 67 is designed as an oblique incidence optical system with a double-path structure in which a light beam coming from the light source with an angle of 0.8 degree in the sub-scanning direction passes through the cylindrical glass lens 7 and the spherical glass lens 6 and enters a deflecting surface of the polygon mirror. The surface shape of the toric lens 10 is represented by the aspherical surface equation indicated in connection with the first embodiment.

The light source means 1 used in this embodiment is a short-wavelength light source with an oscillation wavelength λ of 405 nm, and the embodiment is configured so that the spot diameter in the main scanning cross section and the in the sub-scanning cross section are 53 μm and 70 μm respectively in the whole effective scanning area.

This embodiment is configured so as to satisfy the following condition, $$(0.004(mm^2)/Smin) \times n < 0.03 \quad (1),$$

where n represents the number of the turn back mirrors (n=3 in this embodiment) and Smin (mm²) represents the smallest value among the beam areas on the respective reflection surfaces of the turn back mirrors on which the light beam traveling on the optical axis of the scanning optical system 67 is reflected.

In this embodiment, the first, second and third turn back mirrors 91, 92 and 93 are disposed at positions so as to satisfy condition (2) respectively, and the smallest value Smin of the beam areas at these positions (i.e. on the reflection surfaces) of the light beam traveling on the optical axis of the scanning optical system 67 is:

$$Smin = 0.4268 \times 0.3214 \times \pi = 0.43 \; (mm^2)$$

Then, substituting Smin=0.43 into the above condition (1), $$(0.004/0.43) \times 3 = 0.028 < 0.03,$$

it is shown that the second embodiment satisfy the condition (1). Thus, not only image deterioration due to dusts, scratches or the like but also image deterioration due to fine particles such as toner particles can be prevented.

Furthermore, in this embodiment, three turn back mirrors, or the first, second and third turn back mirrors 91, 92 and 93 are disposed in the optical path between the light deflector 5 and the photosensitive drum 8 as shown in FIG. 4 to enhance freedom of optical path arrangement.

In this embodiment, among the first, second and third turn back mirrors 91, 92 and 93, the first and the second turn back mirrors 91 and 92 are disposed on the polygon mirror 5 side of the toric lens 10 having the strongest power with respect to the sub-scanning direction in the scanning optical system 67. With this feature, the beam is bent in the area in which the beam width is broad in both the main scanning direction and the sub-scanning direction.

The scanning optical system 67 of this embodiment is a very dark optical system with the F-number $Fno_{main}$ in the main scanning cross section of the exit side of 91.74. However, this embodiment is configured so that excellent images are always obtained without being affected by dusts and scratches, by disposing the first, second and third turn back mirrors 91, 92 and 93 in the range that satisfy the following condition.

$$Xi < L - 0.77 \cdot Fno_{main} \; (mm) = 396.6 \; (mm) \quad (2)$$

In this embodiment, the distance L from the deflection point P to the surface to be scanned 8 is L=467.24 (mm), and the distances X1, X2 and X3 from the deflection point P to the first, second and third turn back mirrors 91, 92 and 93 are X1=204.0 (mm), X2=228.8 (mm) and X3=388.2 (mm), respectively. These values satisfy the above condition (2).

(Third Embodiment)

Figure 6:
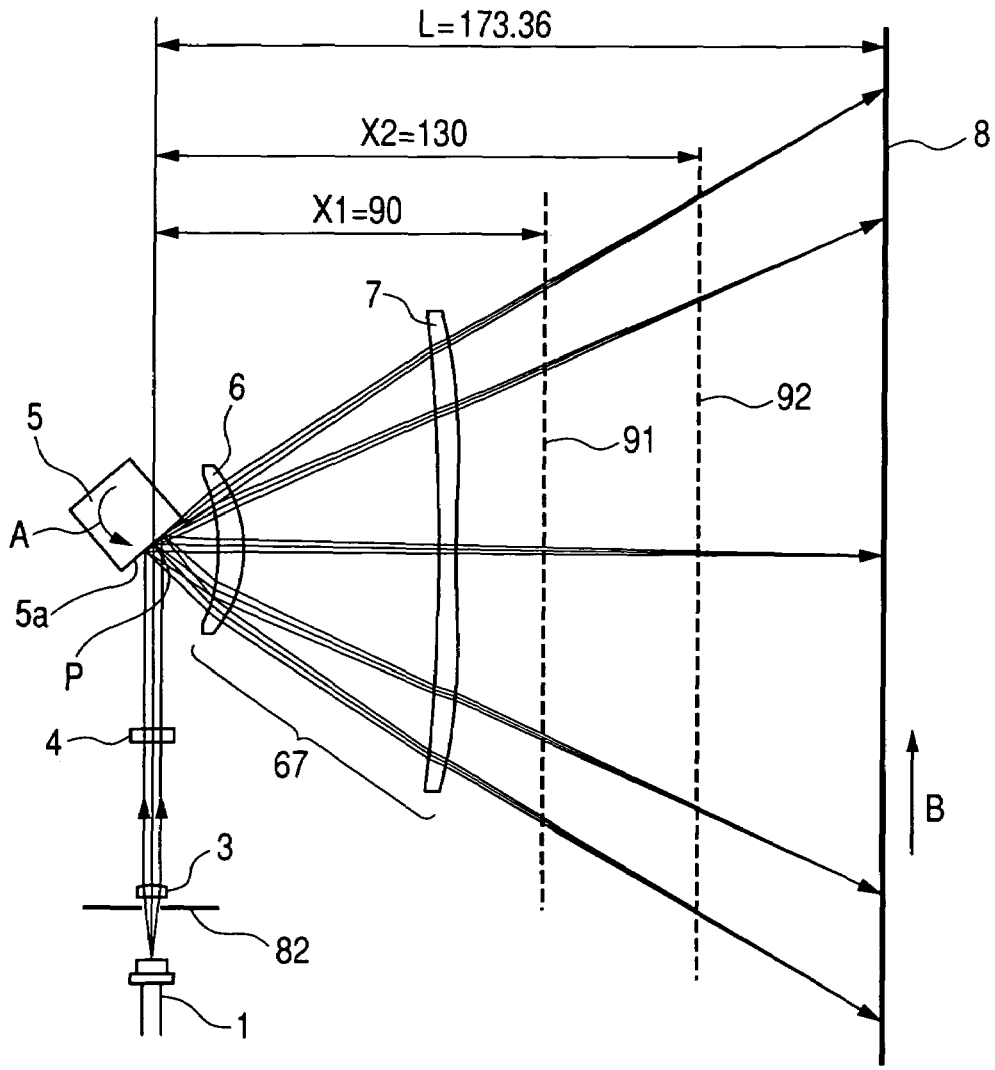
FIG. 6 is a main scanning cross sectional view of a third embodiment of the present invention.
Figure 7:
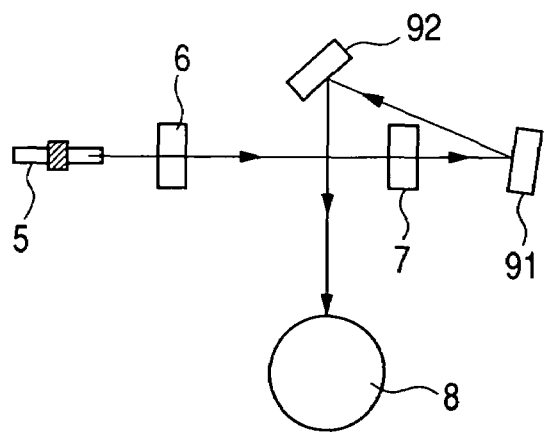
FIG. 7 is a sub-scanning cross sectional view of the third embodiment of the present invention.

FIG. 6 is a cross sectional view in the main scanning direction (or a main scanning cross sectional view) showing the principal portion of the third embodiment of the present invention. FIG. 7 is a cross sectional view in the sub-scanning direction (or a sub-scanning cross sectional view) showing the principal portion of the third embodiment of the present invention. In FIGS. 6 and 7, elements the same as those shown in FIGS. 1 and 2 are designated by the same reference numerals.

What is different in this embodiment from the first embodiment described before is that the diameter of an aperture stop 82 is configured so that set the spot size in the main scanning cross section is set to 30 μm and the spot size in the sub-scanning cross section is set to 35 μm and that the reflecting means is composed of two turn back mirrors 91 and 92. The other structures and optical functions are substantially the same as those in the first embodiment, and the same advantageous effects are achieved by them.

In FIG. 6, reference numeral 82 designates an aperture stop 82, which defines a stop diameter in such a way that the spot size in the main scanning cross section being 30 μm and the spot size in the sub-scanning cross section being 35 μm. Reference numerals 91 and 92 respectively designate first and second turn back mirrors serving as reflecting means, which are adapted to bend the optical path.

In this embodiment, the scanning beam itself has a size substantially the same as that in the above-described conventional apparatus shown in FIG. 15 (which uses an infrared laser with a spot size of 60 μm×70 μm). However, the oscillation wavelength of the light source means is shorter ($\lambda$=405(nm)), and accordingly the degree of dispersion of the scanning light caused by contamination (for example by toner) of several micrometers in size on the surface of the turn back mirrors is worse.

In view of this, as with the above-described first embodiment, this embodiment is so configured that the number n (n=2) of the turn back mirrors and the smallest value Smin (mm$^2$) among the beam areas on the respective reflection surfaces of the turn back mirrors, of the light beam traveling on the optical axis of the scanning optical system 67 satisfy the following condition.

$$(0.004(\text{mm}^2)/Smin) \times n < 0.03 \quad (1)$$

In this embodiment, the first and second turn back mirrors 91 and 92 are disposed at positions that satisfy condition (2) respectively, and the smallest value Smin among the beam areas at these positions (i.e. on the reflection surfaces) of the light beam traveling on the optical axis of the scanning optical system 67 is:

$$Smin = 0.490 \times 0.4231 \times \pi = 0.65 \ (\text{mm}^2).$$

Then, the above condition (1) is satisfied as follows.

$$(0.004/0.65) \times 2 = 0.0123 < 0.03$$

Thus, not only image deterioration due to dusts, scratches or the like but also image deterioration due to fine particles such as toner particles can be prevented.

The F-number $Fno_{main}$ in the main scanning cross section of the exit side of the scanning optical system 67 of this embodiment is 43.6 ($Fno_{main}$=43.6). In this embodiment, the first and second turn back mirrors 91 and 92 are disposed so as to satisfy the following condition, $$Xi < L - 0.77 \cdot Fno_{main} \ (\text{mm}) = 139.8 \ (\text{mm}) \quad (2),$$

thereby excellent images are always obtained without being affected by dusts and scratches.

In this embodiment, the distance L from the deflection point P to the surface to be scanned 8 is L=173.36 (mm), and the distances X1 and X2 from the deflection point P to the first and second turn back mirrors 91 and 92 are 90 (mm) and 130 (mm), respectively. These values satisfy the above condition (2).

Although the scanning optical system 67 is composed of two lenses in the first and third embodiment and three in the second embodiment, the number of the lenses is not limited to them. For example, the scanning optical system may be composed of a single lens or more than three lenses. Furthermore, the scanning optical system may include a diffraction optical element. Any of the above embodiments may be applied to a multi-beam scanning optical system having a plurality of light emitting portions.

(Image Forming Apparatus)

Figure 8:
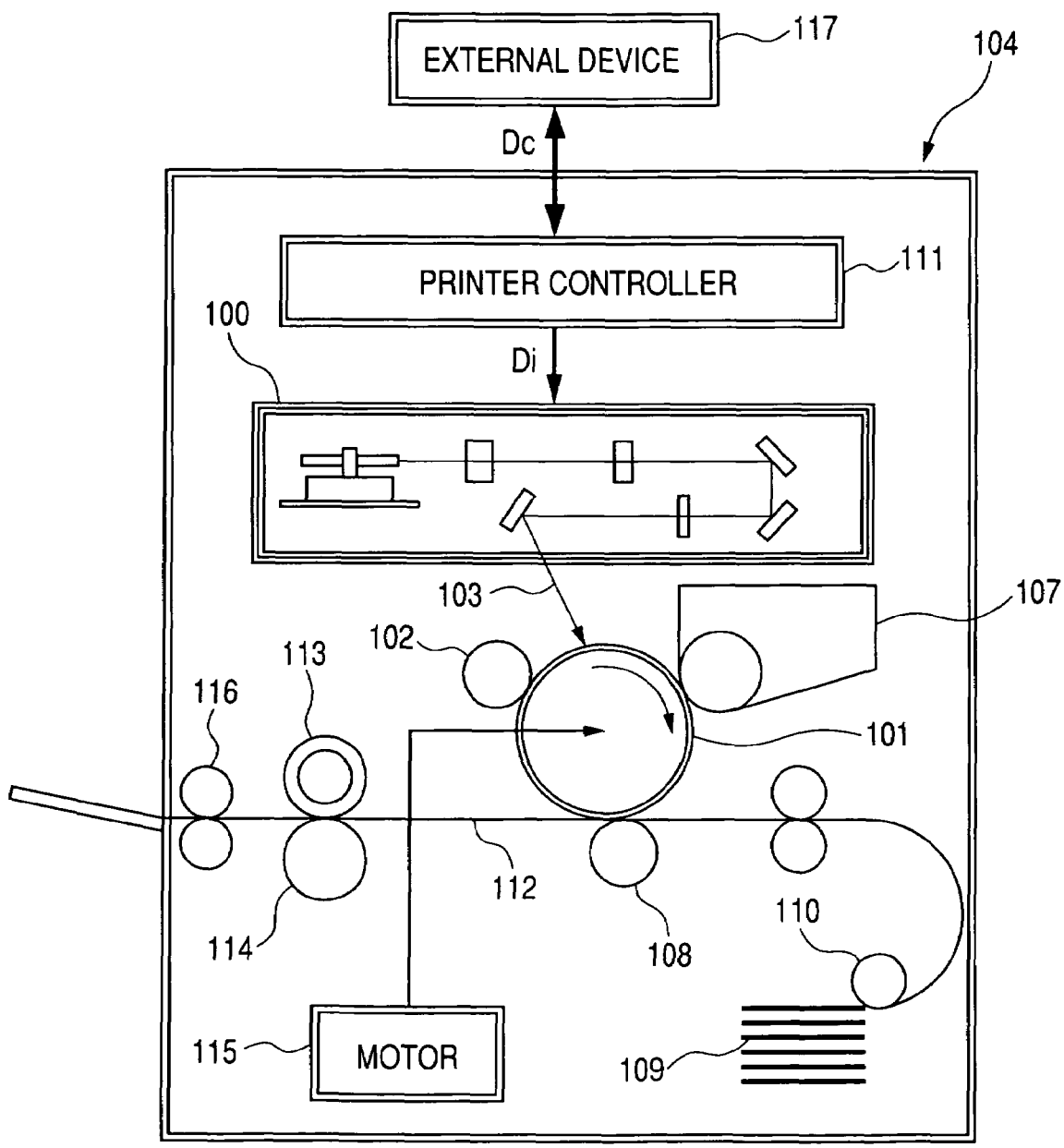
FIG. 8 is a sub-scanning cross sectional view of an embodiment of the image forming apparatus according to the present invention.

FIG. 8 is a cross sectional view in the sub-scanning direction showing the principal portion of an image forming apparatus according to an embodiment of the present invention. In FIG. 8, reference numeral 104 designates an image forming apparatus. Code data Dc is inputted to the image forming apparatus 104 from an external device such as a personal computer. The code data Dc is converted into image data (dot data) Di by a printer controller 111 implemented in the apparatus. The image data Di is inputted to an optical scanning unit 100 having the structure described as the second embodiment. From this optical scanning unit 100, a light beam 103 modulated in accordance with the image data Di is emitted, and the photosensitive surface of a photosensitive drum 101 is scanned with the light beam 103 in the main scanning direction.

The photosensitive drum 101 serving as an electrostatic latent image bearing member (or a photosensitive member) is rotated in the clockwise direction by a motor 115. With the rotation, the photosensitive surface of the photosensitive drum 101 moves relative to the light beam 103 in the sub-scanning direction that is orthogonal to the main scanning direction. A charging roller 102 for uniformly charging the surface of the photosensitive drum 101 is provided in such a way as to be in contact with the surface of the photosensitive drum 101 at an upper position on the photosensitive drum 101. The surface of the photosensitive drum 101 charged by the charging roller 102 is adapted to be irradiated with the light beam 103 that is moved for scanning by the aforementioned optical scanning unit.

As described before, the light beam 103 has been modulated based on the image data Di, and an electrostatic latent image is formed on the surface of the photosensitive drum 101 by irradiation with the light beam. The electrostatic latent image is developed as a toner image by a developing device 107 that is disposed in the downstream of the irradiation position of the light beam 103 with respect to the direction of the rotation of the photosensitive drum 101 in such a way as to be in contact with the photosensitive drum 101.

At a lower position on the photosensitive drum 101, the toner image developed by the developing device 107 is transferred onto a paper sheet 112 as a material to be transferred by a transfer roller 108 opposed to the photosensitive drum 101. The paper sheets 112 are stored in a sheet cassette 109 provided on the front side (i.e. the right side in FIG. 8) of the photosensitive drum 101. Alternatively, the sheet 112 may be fed manually. At one end of the sheet cassette 109, there is provided a sheet feeding roller 110 to deliver a paper sheet 112 stored in the sheet cassette 109 to the carrying path.

As per the above, the paper sheet 112 on which an unfixed toner image has been transferred is further conveyed to a fixing device disposed on the rear side (i.e. the left side in FIG. 8) of the photosensitive drum 101. The fixing device is composed of a fixing roller 113 having a fixing heater (not shown) in the interior thereof and a pressurizing roller 114 that is in pressure contact with the fixing roller 113. The paper sheet 112 conveyed from the transferring portion is pressed and heated in the pressing portion between the fixing roller 113 and the pressurizing roller 114, so that the unfixed toner image on the paper sheet 112 is fixed. A sheet discharge roller 116 is further provided on the rear side of the fixing roller 113 to discharge the fixed paper sheet 112 to the exterior of the image forming apparatus.

The printer controller 111 is adapted to control not only the above-described data conversion but also operations of various portions of the image forming apparatus such as the motor 115 and a polygon motor in the optical scanning unit that will be described later.

(Color Image Forming Apparatus)

Figure 9:
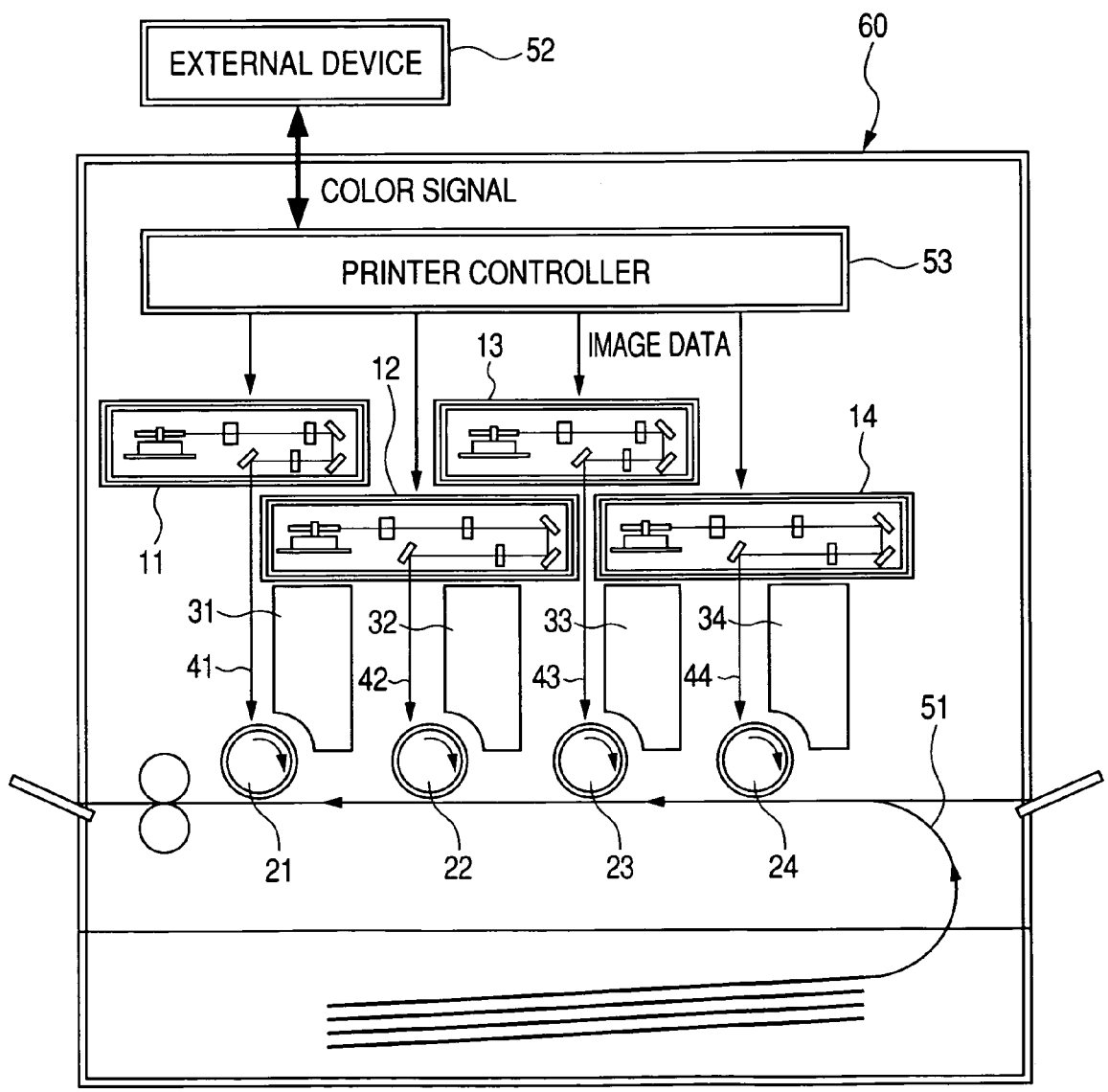
FIG. 9 schematically shows the principal portion of a color image forming apparatus according to an embodiment of the present invention.
Figure 10:
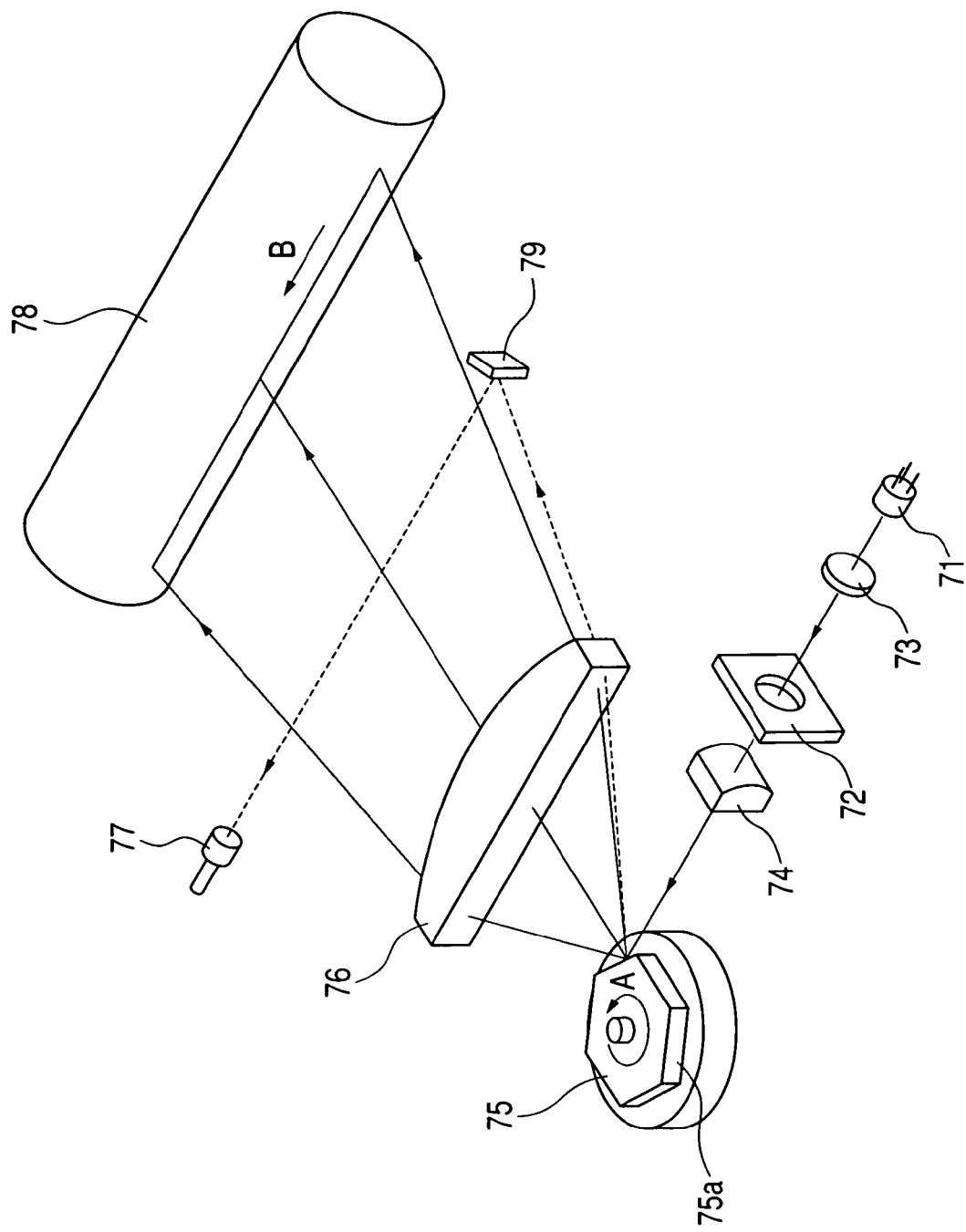
FIG. 10 schematically shows the principal portion of a conventional optical scanning apparatus.
Figure 11:
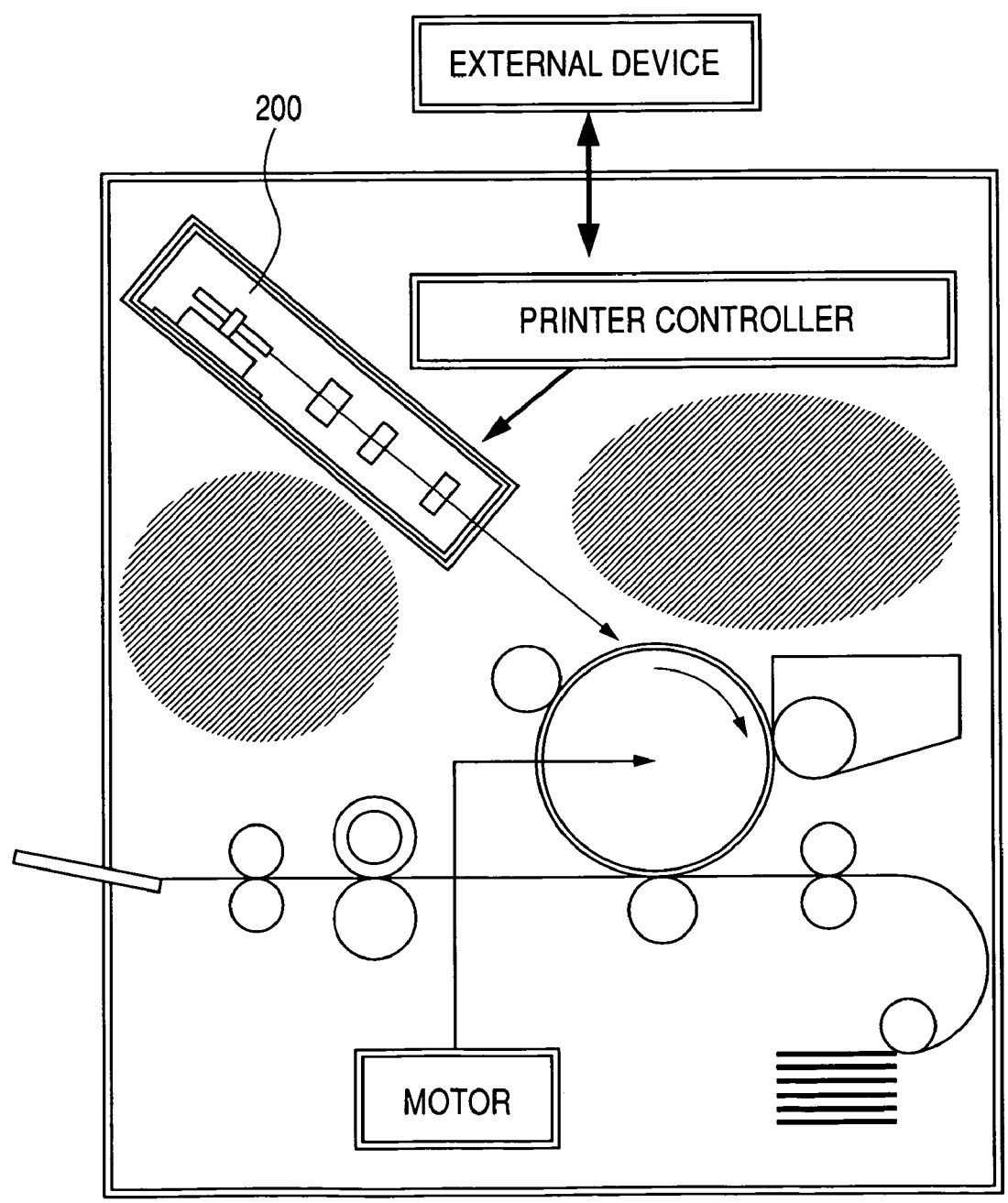
FIG. 11 is a sub-scanning cross sectional view of a conventional image forming apparatus.
Figure 12:
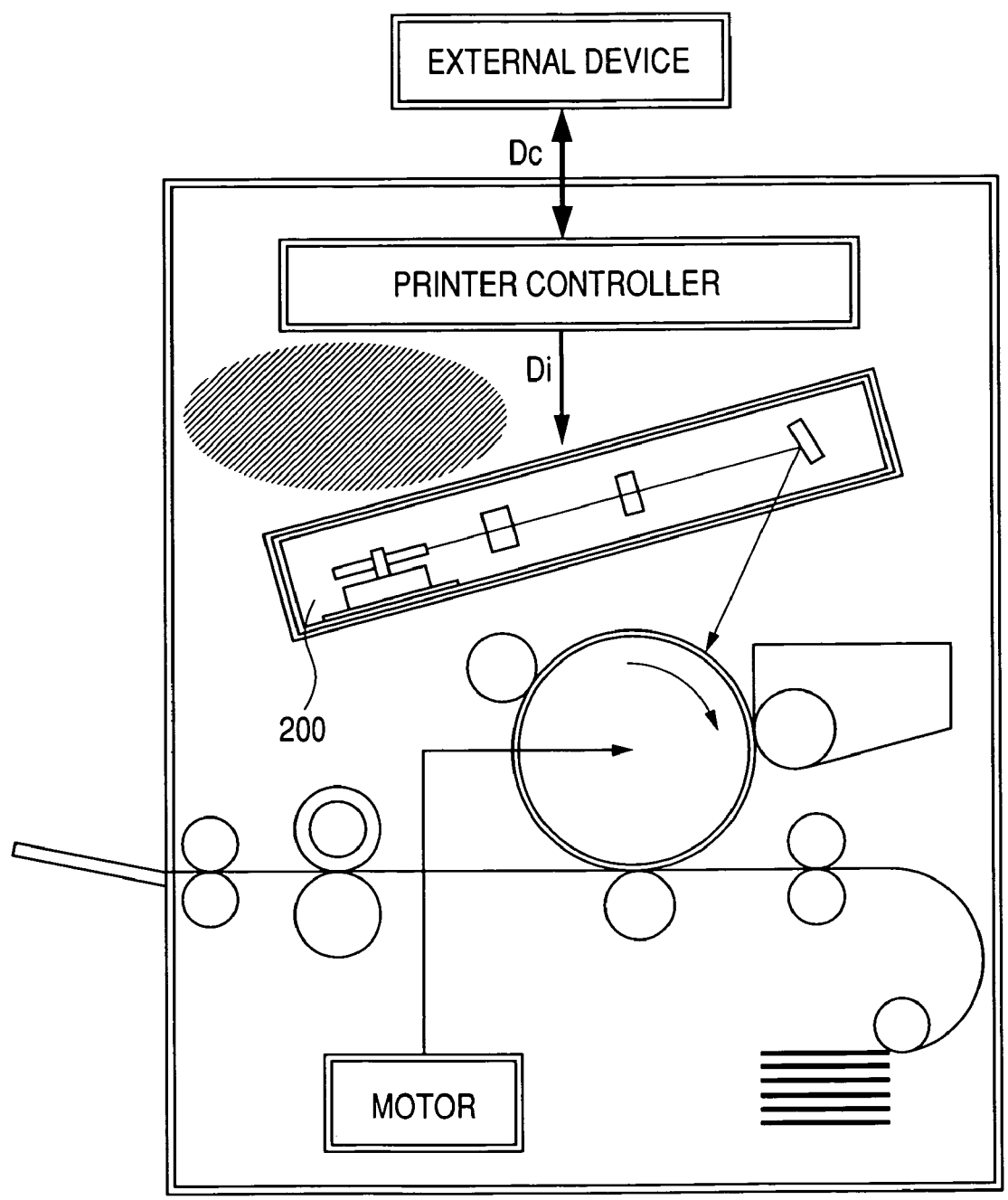
FIG. 12 is a sub-scanning cross sectional view of a conventional image forming apparatus.
Figure 13:
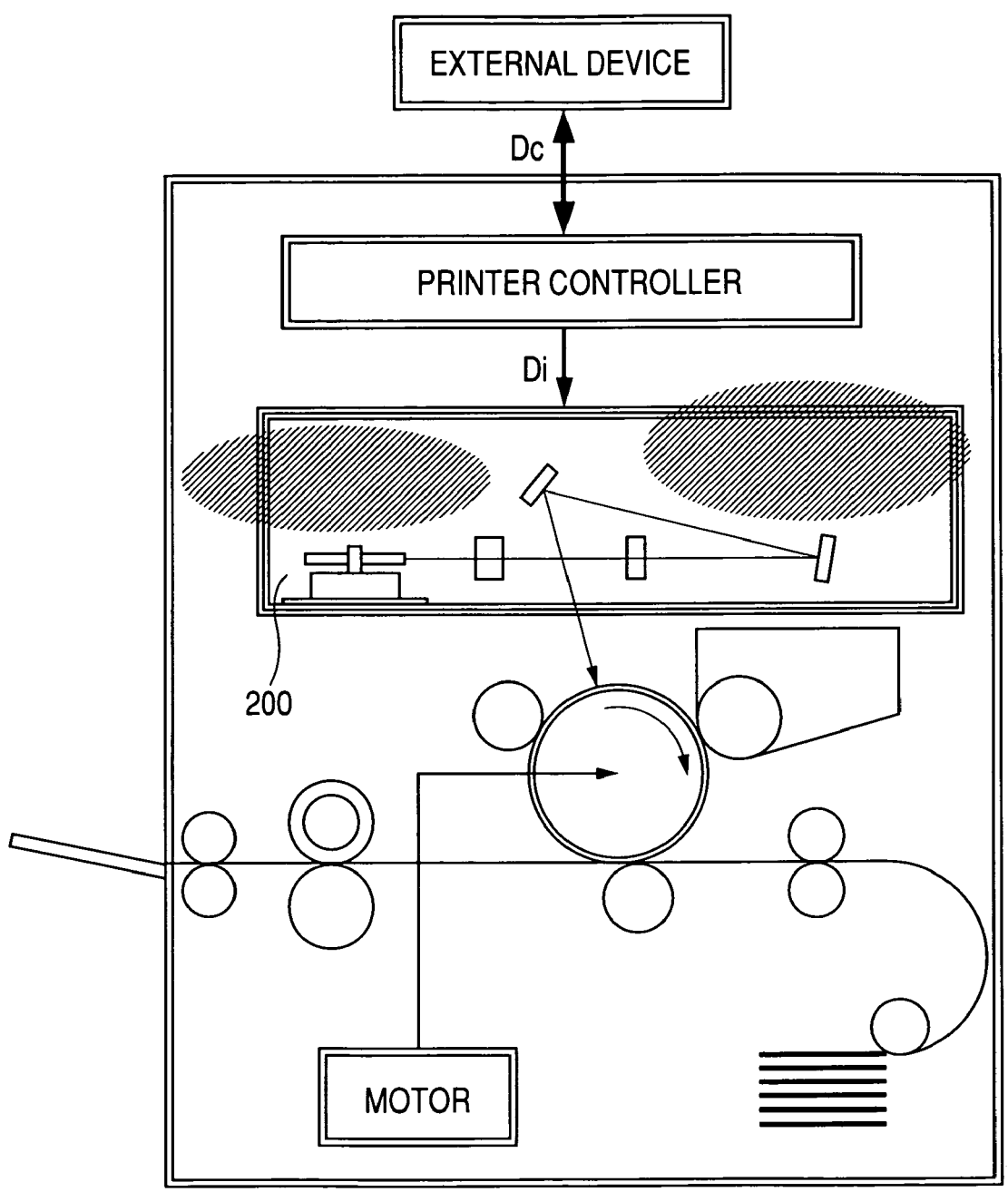
FIG. 13 is a sub-scanning cross sectional view of a conventional image forming apparatus.
Figure 14:
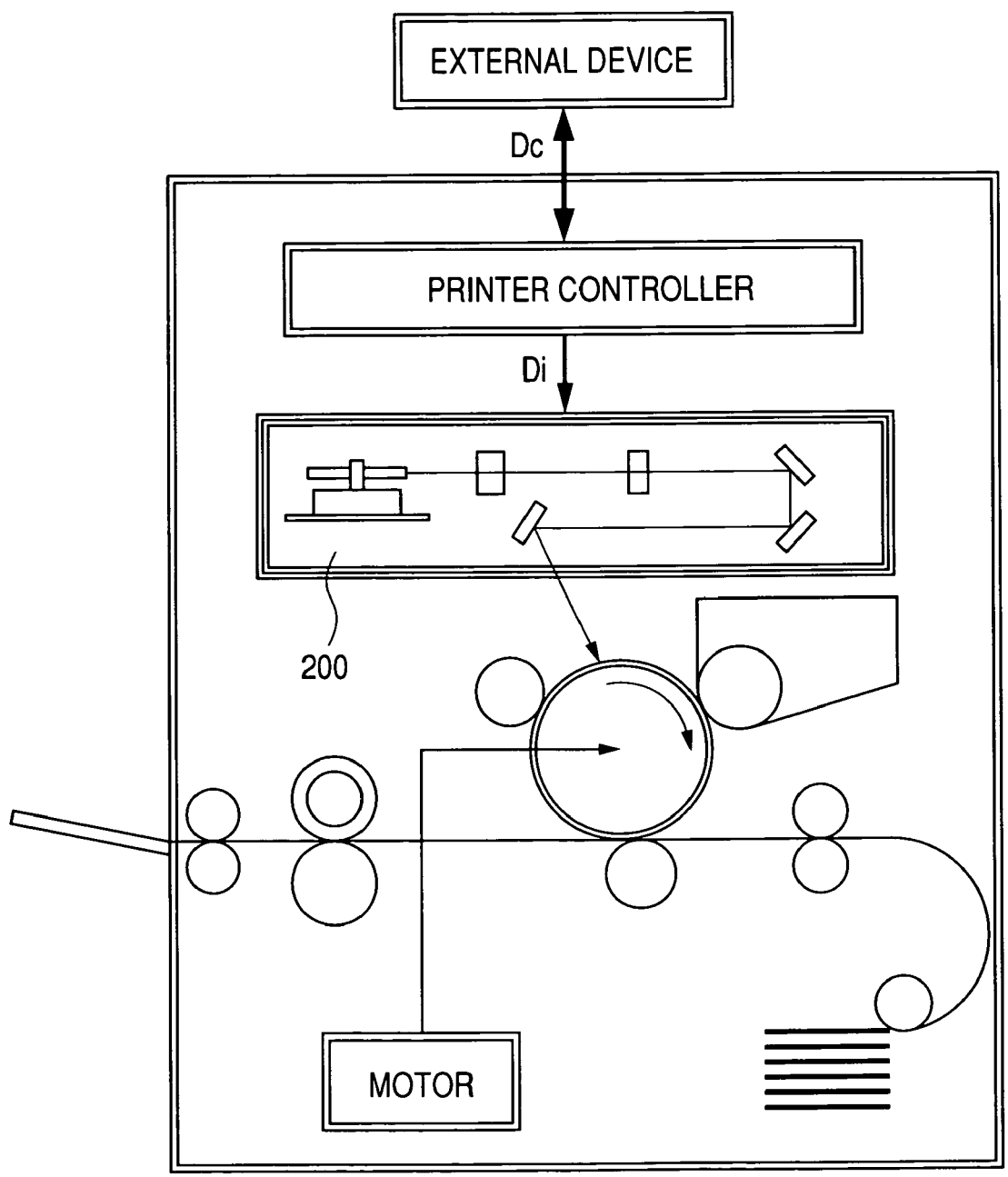
FIG. 14 is a sub-scanning cross sectional view of a conventional image forming apparatus.

FIG. 9 is a diagram schematically showing the principal portion of a color image forming apparatus according to an embodiment of the present invention. The apparatus of this embodiment is a tandem type color image forming apparatus in which four optical scanning apparatuses are disposed side by side to record image information on surfaces of photosensitive drums serving as image bearing members in parallel. In FIG. 9, reference numeral 60 designates a color image forming apparatus, reference numerals 11, 12, 13 and 14 designate optical scanning apparatuses each having the structure described as the second embodiment, reference numerals 21, 22, 23 and 24 designate photosensitive drums serving as image bearing members, reference numerals 31, 32, 33 and 34 designate developing devices, and reference numeral 51 designates a conveying belt.

Referring to FIG. 9, signals for respective colors of red (R), green (G) and blue (B) are inputted to the color image forming apparatus 60 from an external device 52 such as a personal computer. These color signals are converted into image data (dot data) for respective colors of cyan (C), magenta (M), yellow (Y) and black (B) by the printer controller installed in the color image forming apparatus. These image data are inputted to the optical scanning apparatuses 11, 12, 13 and 14 respectively. Light beams 41, 42, 43 and 44 that have been modulated in accordance with the respective image data are emitted from these optical scanning apparatus, and the photosensitive surfaces of the photosensitive drums 21, 22, 23 and 24 are scanned with these light beams in the main scanning direction.

The color image forming apparatus according to this embodiment is equipped with the four optical scanning apparatuses (11, 12, 13, and 14) disposed side by side, each of which corresponds to cyan (C), magenta (M), yellow (Y) and black (B) respectively. The optical scanning apparatuses are adapted to record image signals (image information) on the respective surfaces of the photosensitive drums 21, 22, 23 and 24 in parallel to print a color image at high speed.

As above, in the color image forming apparatus according to this embodiment, latent images of the respective colors are formed on the respective surfaces of the corresponding photosensitive drums 21, 22, 23 and 24 using light beams modulated based on the respective image data by means of the four optical scanning apparatuses 11, 12, 13 and 14. After that, a single full color image is formed on a recording material by superimposing transfer.

The aforementioned external device 52 may be, for example, a color image reading apparatus equipped with a CCD sensor. In this case, the color image reading apparatus and the color image forming apparatus 60 can constitute a color digital copying machine.

This application claims priority from Japanese Patent Application No. 2004-164644 filed Jun. 2, 2004, which is hereby incorporated by reference herein.

What is claimed is:

1. An optical scanning apparatus comprising:
light source means;
deflecting means;
a first optical system for guiding a light beam emitted from the light source means to the deflecting means; and
a second optical system for guiding the light beam reflected and deflected by the deflecting unit to a surface to be scanned through reflecting unit including n (n is an integer equal to or larger than 1) reflecting members,
wherein the following conditions are satisfied:

$$70 < Fno_{main}, \text{ and}$$

$$(0.004/Smin) \times n < 0.03$$

where $Fno_{main}$ (mm) is the F-number in a main scanning cross section of an exit side of the second optical system, and Smin (mm$^2$) is the smallest beam area among beam areas on reflecting surfaces of the n reflecting members on which the light beam is reflected during traveling on the optical axis of the second optical system.

2. An optical scanning apparatus according to claim 1, wherein the n reflecting members are provided at positions so as to satisfy the following condition:

$$Xi < L - 0.77 \times Fno_{main}$$

where L (mm) is the distance from a deflection point of the light beam reflected by said deflecting unit to said surface to be scanned, and Xi (i=1, 2, ..., n) (mm) is the distance from the deflection point to the i-th reflecting member of the n reflecting members.

3. An optical scanning apparatus according to claim 1, wherein the following condition is satisfied:

$$0.5 < |\beta|$$

where β is the imaging magnification in a sub-scanning direction of said second optical system.

4. An optical scanning apparatus according to claim 3, wherein at least one reflecting member among said n reflecting members is disposed on the deflecting unit side of an imaging optical element that has the strongest optical power in the sub-scanning direction in said second optical system.

5. An optical scanning apparatus according to claim 1, wherein the wavelength of the light beam emitted from said light source unit is equal to or smaller than 500 nm.

6. An optical scanning apparatus comprising:
light source unit;
deflecting unit;
a first optical system for guiding a light beam emitted from the light source unit to the deflecting unit; and a second optical system for guiding the light beam reflected and deflected by the deflecting unit to a surface to be scanned through reflecting unit including n (n is an integer equal to or larger than 1) reflecting members, wherein the wavelength of the light beam emitted from the light source unit is equal to or smaller than 500 nm, and the following condition is satisfied:

$$(0.004/Smin) \times n < 0.03$$

where Smin (mm$^2$) is the smallest beam area among beam areas on reflecting surfaces of the n reflecting members on which a light beam is reflected during traveling on the optical axis of the second optical system.

7. An optical scanning apparatus according to claim 6, wherein the n reflecting members are provided at positions so as to satisfy the following condition:

$$Xi < L - 0.77 \times Fno_{main}$$

where $Fno_{main}$ (mm) is the F-number of an exit side of the second optical system in a main scanning cross section, L (mm) is the distance from a deflection point of the light beam reflected by said deflecting unit to said surface to be scanned, and Xi (i=1, 2, . . . , n) (mm) is the distance from the deflection point to the i-th reflecting member of the n reflecting members.

8. An optical scanning apparatus according to claim 6, wherein the following condition is satisfied:

$$0.5 < |\beta|$$

where $\beta$ is the imaging magnification in a sub-scanning direction of said second optical system.

9. An optical scanning apparatus according to claim 8, wherein at least one reflecting member among said n reflecting members is disposed on the deflecting unit side of an imaging optical element that has the strongest optical power in the sub-scanning direction in said second optical system.

10. An optical scanning apparatus according to claim 1, wherein said reflecting member comprises a turn back mirror.

11. An optical scanning apparatus according to claim 6, wherein said reflecting member comprises a turn back mirror.

12. An optical scanning apparatus according to claim 1, wherein the light beam emitted from said light source unit is incident on a deflecting surface of said deflecting unit with a beam width wider than the width of the deflecting unit in the main scanning direction.

13. An optical scanning apparatus according to claim 6, wherein the light beam emitted from said light source unit is incident on a deflecting surface of said deflecting unit with a beam width wider than the width of the deflecting unit in the main scanning direction.

14. An image forming apparatus comprising:
an optical scanning apparatus according to claim 1;
a photosensitive member disposed on said surface to be scanned;
a developing device for developing an electrostatic latent image formed on said photosensitive member by a light beam scanned by said optical scanning apparatus, as a toner image;
a transferring device for transferring a developed toner image onto a material to be transferred; and
a fixing device for fixing a transferred toner image on the material to be transferred.

15. An image forming apparatus comprising an optical scanning apparatus according to claim 1 and a printer controller that converts code data inputted from an external device into an image signal and inputs the image signal to said optical scanning apparatus.

16. A color image forming apparatus comprising a plurality of image bearing members on which images of different colors are respectively formed, the image bearing members being disposed on the respective surfaces to be scanned of optical scanning apparatuses according to claim 1.

17. A color image forming apparatus according to claim 16, further comprising a printer controller that converts color signals inputted from an external device into image data of different colors and inputs the image data of different colors to the respective optical scanning apparatuses.

18. An image forming apparatus comprising:
an optical scanning apparatus according to claim 6;
a photosensitive member disposed on said surface to be scanned;
a developing device for developing an electrostatic latent image formed on said photosensitive member by a light beam scanned by said optical scanning apparatus, as a toner image;
a transferring device for transferring a developed toner image onto a material to be transferred; and
a fixing device for fixing a transferred toner image on the material to be transferred.

19. An image forming apparatus comprising an optical scanning apparatus according to claim 6 and a printer controller that converts code data inputted from an external device into an image signal and inputs the image signal to said optical scanning apparatus.

20. A color image forming apparatus comprising a plurality of image bearing members on which images of different colors are respectively formed, the image bearing members being disposed on the respective surfaces to be scanned of optical scanning apparatuses according to claim 6.

* * * * *

UNITED STATES PATENT AND TRADEMARK OFFICE
CERTIFICATE OF CORRECTION

PATENT NO. : 7,218,434 B2
APPLICATION NO. : 11/136516
DATED : May 15, 2007
INVENTOR(S) : Hidekazu Shimomura It is certified that error appears in the above-identified patent and that said Letters Patent is hereby corrected as shown below:

Title Page item 57
<u>IN THE ABSTRACT:</u>
Line 3, "dusts," should read -- dust, --, and "etc" should read -- etc. --.

<u>COLUMN 4:</u>
Line 26, "($m^2$)" should read -- ($mm^2$) --.

<u>COLUMN 9:</u>
Line 66, "dusts," should read -- dust, --.

<u>COLUMN 13:</u>
Line 51, "the" (1st occurrence) should read -- the spot diameter --.

<u>COLUMN 15:</u>
Line 57, "Smin=0.490x0.4231xπ =0.65 (mm)$^2$." should read -- $Smin = 0.4900 \times 0.4231 \times \pi = 0.65 \, (mm)^2$. --; and
Line 63, "dusts," should read -- dust, --.

<u>COLUMN 16:</u>
Line 7, "dusts" should read -- dust --.

UNITED STATES PATENT AND TRADEMARK OFFICE
CERTIFICATE OF CORRECTION

PATENT NO. : 7,218,434 B2
APPLICATION NO. : 11/136516
DATED : May 15, 2007
INVENTOR(S) : Hidekazu Shimomura It is certified that error appears in the above-identified patent and that said Letters Patent is hereby corrected as shown below:

COLUMN 20:
      Line 52, insert claim 21, as follows:
-- 21. A color image forming apparatus according to claim 20, further comprising a printer controller that converts color signals inputted from an external device into image data of different colors and inputs the image data of different colors to the respective optical scanning apparatuses. --.

Signed and Sealed this

Twenty-second Day of July, 2008

JON W. DUDAS
*Director of the United States Patent and Trademark Office*